(12) United States Patent
    Forslöw

(10) Patent No.: US 7,155,518 B2
(45) Date of Patent: Dec. 26, 2006

(54) EXTRANET WORKGROUP FORMATION ACROSS MULTIPLE MOBILE VIRTUAL PRIVATE NETWORKS

(75) Inventor: Jan Forslöw, Stockholm (SE)

(73) Assignee: Interactive People Unplugged AB, Stockholm (SE)

( * ) Notice: Subject to any disclaimer, the term of this patent is extended or adjusted under 35 U.S.C. 154(b) by 894 days.

(21) Appl. No.: 09/755,027

(22) Filed: Jan. 8, 2001

(65) Prior Publication Data
    US 2002/0133534 A1    Sep. 19, 2002

(51) Int. Cl.
    G06F 15/16     (2006.01)
    H04L 29/06     (2006.01)

(52) U.S. Cl. .................. 709/227; 709/205; 709/238; 709/223; 455/461

(58) Field of Classification Search ................ 709/238, 709/242–249, 227, 250, 223, 201, 205; 370/251, 370/252, 401, 329, 352, 390; 455/403, 461, 455/451
    See application file for complete search history.

(56) References Cited

U.S. PATENT DOCUMENTS

| | | | |
|---|---|---|---|
| 6,445,920 B1 * | 9/2002 | Pfundstein | 455/422.1 |
| 6,539,483 B1 * | 3/2003 | Harrison et al. | 713/201 |
| 6,571,289 B1 * | 5/2003 | Montenegro | 709/227 |
| 6,594,704 B1 * | 7/2003 | Birenback et al. | 709/238 |
| 6,734,699 B1 * | 5/2004 | Herr et al. | 326/1 |
| 6,778,494 B1 * | 8/2004 | Mauger | 370/230 |
| 6,954,790 B1 * | 10/2005 | Forslow | 709/227 |
| 6,977,938 B1 * | 12/2005 | Alriksson et al. | 370/401 |
| 6,980,524 B1 * | 12/2005 | Lu et al. | 370/254 |
| 2001/0033556 A1 * | 10/2001 | Krishnamurthy et al. | 370/329 |

OTHER PUBLICATIONS

"Ad Hoc On-Demand Distance Vector (AODV) Routing" -by Perkins, Royer, Das, Oct. 22, 1999.*

* cited by examiner

Primary Examiner—Jeffrey Pwu
(74) Attorney, Agent, or Firm—Banner & Witcoff, Ltd.

(57) ABSTRACT

The present invention describes a network-based mobile workgroup system allowing a selected set of users from two or more mobile virtual private networks to form an extranet workgroup in a secure manner. The invention is based on the limited private address scenario, which entitles mobile nodes having private, possibly overlapping, addresses as defined in RFC 1918, while home and foreign agents have public IP addresses. Each home agent is dedicated to one mobile virtual private network (M-VPN), while a foreign agent may be shared by multiple M-VPNs. The system also entails a mobile service manager that has a public IP address and a set of mobile nodes that all have a UFQDN (user fully qualified domain name) within the overall mobile workgroup system.

The main benefits, compared to existing solution for extranet workgroup creation, are that extranets can be created despite overlapping address realms. Even fine-granular workgroups within the extranet can be created with any set of users from any set of M-VPNs. The mobility aspect of the M-VPN fits well for supporting peer-to-peer applications, such as voice over IP, between mobile clients. Although the mobile clients may belong to different M-VPNs, with different address realms, per packet authentication and filtering is always possible to perform by the ingress M-VPN security gateway using a realm-indexed filtering technique. Finally, the responsibility for allocating resources, to be reached by an extranet workgroup, is completely delegated to each M-VPN.

29 Claims, 18 Drawing Sheets

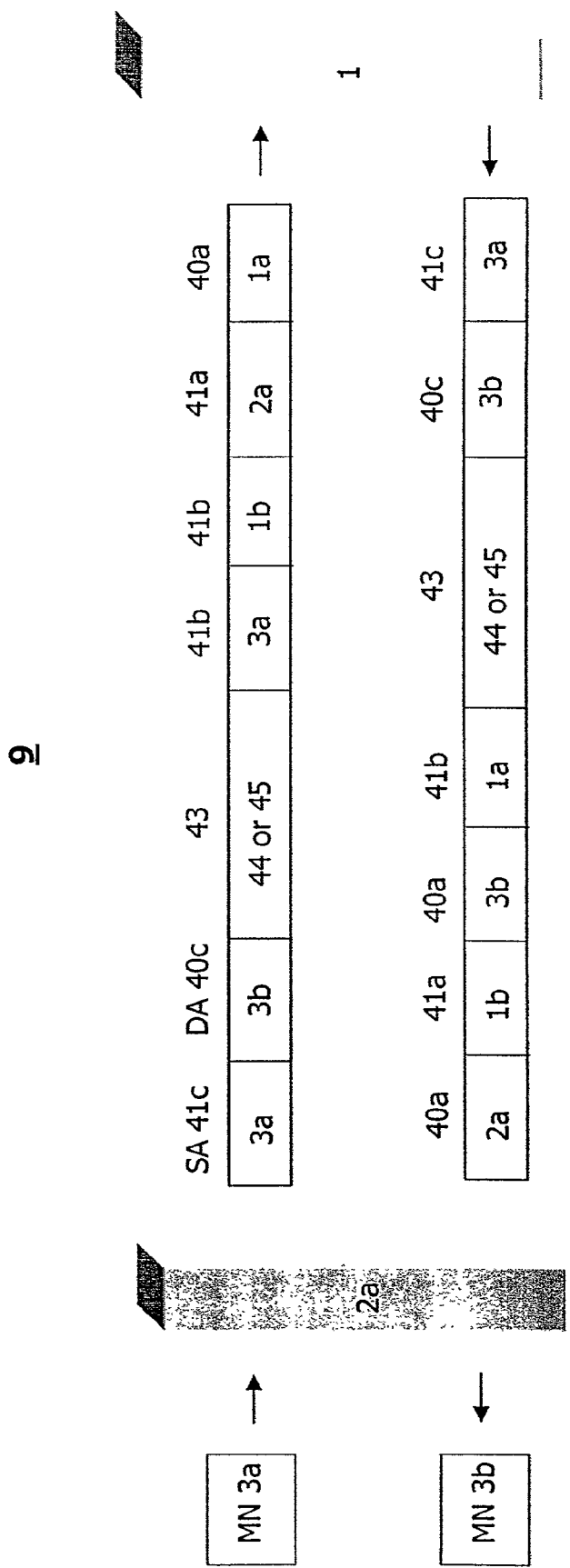

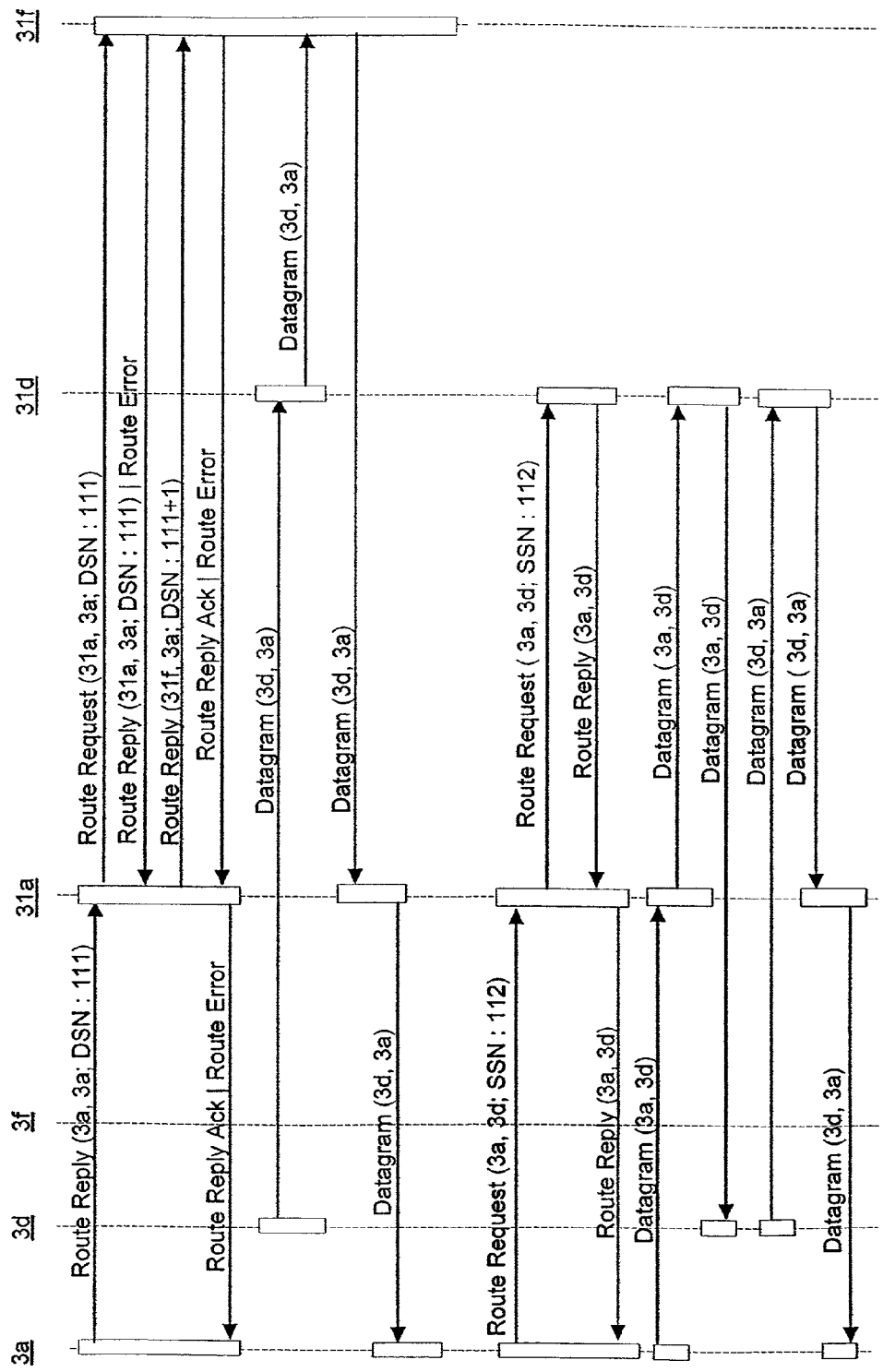

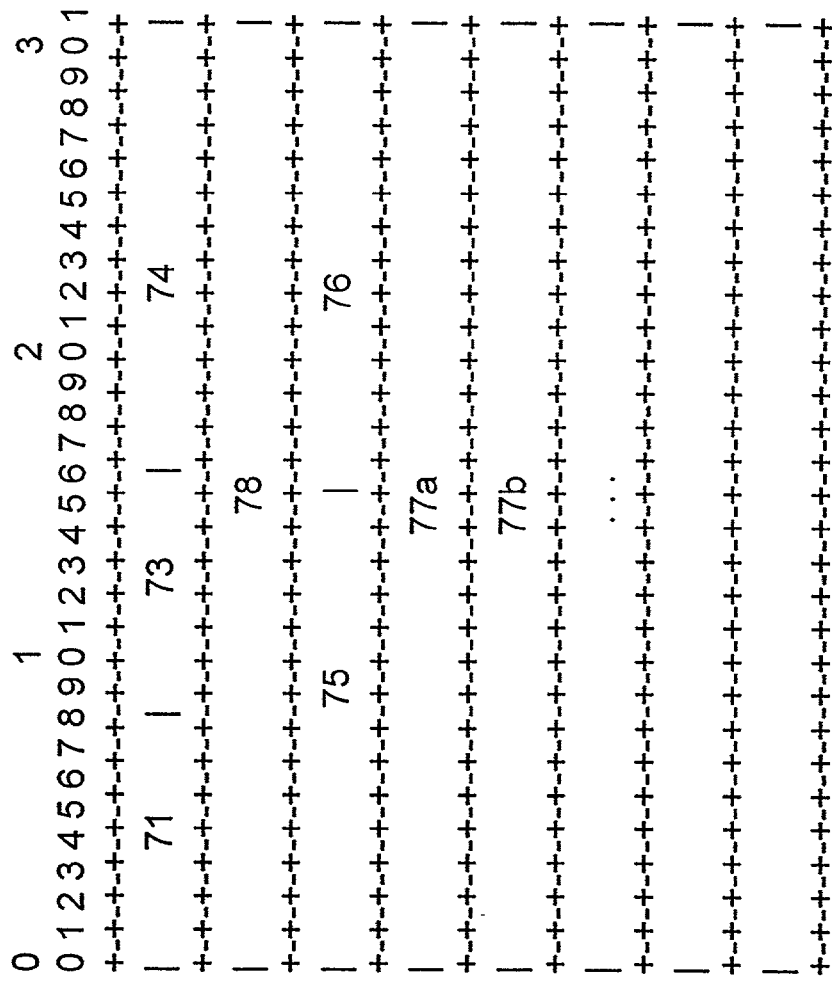

EXTRANET WORKGROUP FORMATION ACROSS MULTIPLE MOBILE VIRTUAL PRIVATE NETWORKS

FIELD OF THE INVENTION

The present invention relates to mobile data communications in general. More specifically, the present invention describes a network-based mobile workgroup system allowing a selected set of users from two or more mobile virtual private networks to form an extranet workgroup in a secure manner.

BACKGROUND AND SUMMARY OF THE INVENTION

The following definitions are introduced for the purpose of clarity.

AAA Authentication, Authorization and Accounting: AAA is a common name for both RADIUS and DIAMETER, i.e. solutions providing customer care, control and billing in a large IP network.

DIAMETER: A successor of RADIUS with increased security and scalability features compared to its predecessor RADIUS. It is currently under standardization by the IETF.

DHCP: Dynamic Host Configuration Protocol. DHCP is an Internet Engineering Task Force (IETF) standard for allocating Internet Protocol addresses and other configuration information to User Systems. User Systems can either be Fixed Hosts or Mobile Hosts. The allocation is done each time when the User System is started. A DHCP server allocates the information, which is then transferred to a DHCP client. An Internet Service Provider or an IT-department controls the DHCP server. The DHCP client is a SW functionality embedded in the User System.

DMZ: De-Militarized Zone is a zone between the Internet Service Provider router and Corporate firewall where access is allowed from both the Internet and the Intranet. Normally a subset of the services available on the Intranet is mirrored on the DMZ.

FA: Foreign Agent. The primary responsibility of an FA is to act as a tunnel agent which establishes a tunnel to a HA on behalf of a mobile node in a mobile IP environment.

HA: Home Agent. The primary responsibility of the HA is to act as a tunnel agent which terminates the mobile IP tunnel, and which encapsulates datagrams to be sent to the Mobile Node in mobile IP.

IETF: Internet Engineering Task Force. The IETF is the standardization organization for the Internet community.

IP: Internet Protocol. IP is a network layer protocol according to the ISO protocol layering. IP is the major end-to-end protocol between Mobile and Fixed End-Systems for Data Communications.

MANET: Mobile Ad hoc Networks. MANET is a common name for a family of protocols that provide multi-hop routing in highly dynamic mobile environments.

MIP: Mobile IP. MIP is an IP mobility standard being defined by the IETF with the purpose to make IP networks mobility aware, i.e. providing IP entities knowledge on where a Mobile Node is attached to the network. The standard includes the definition of a Foreign Agent and a Home Agent.

MN: Mobile Node. The MN comprises both the Terminal Equipment (TE) and the Mobile Termination (MT).

VLAN: Virtual Local Area Network. VLAN is a separation of a physical Local Area Network into a set of logical subnets.

VPN: Virtual Private Network. VPN is a secure overlay network on a common public infrastructure that allows a corporation to maintain its own addressing and routing between its sites and to remote users.

WLAN: Wireless Local Area Network. WLAN is a local area solution for radio access mobility for Mobile Nodes.

The business communication process consisting of suppliers, customers and partners are getting more and more interlaced. Even if business-to-business communication is in the midst of its hype, and the reality may not be as glamorous as first described, the needs for such solutions will remain. Extranets will play an important role of customer relationship management in the future.

However, as the security consciousness increase in organizations, it is not satisfactorily to just tie two or more companies together into an extranet. One would like to form workgroups within this extranet in order to create smaller zones-of-trust, allowing only a set of people to have access to a set of resources. This development has got increased focus as studies, such as the 2000 CSI-FBI Computer Crime and Security Survey, indicate that more than 70% of all unauthorized access to confidential information is made from the inside (i.e. not from the Internet). These types of computer crimes are by far the most expensive of all computer crimes within an enterprise.

There are essentially two network types where one can include support for extranet solutions. One is in the virtual private network that connects sites together and the other is in the campus networks of each site. The current best practice for both these network types are explained in the following chapter.

Several solutions have been put forward to achieve different levels of network privacy when building VPNs across a shared IP backbone, so target network-based VPNs. Most of these solutions require separate per VPN forwarding capabilities and make use of IP or MPLS based tunnels across the backbone network. The state of the art when it comes to providing extranets in network-based VPNs is to deploy of a set of virtual routers (VRs) in one physical router. In this sense both intranet and extranet VPNs can be deployed, each using a separate virtual router. The objective is to provide per VPN based routing, forwarding, quality of service, and service management capabilities. The virtual router concept deploys exactly the same mechanisms as a physical router, and therefore inherits all existing mechanisms and tools for configuration, deployment, operation, troubleshooting, monitoring, and accounting. Virtual routers can be deployed in different VPN configurations, direct VR to VR connectivity through layer-2 links/tunnels or by aggregating multiple VRs into a single VR combined with IP or MPLS based tunnels. This architecture accommodates different backbone deployment scenarios, e.g. where the VPN service provider owns the backbone, but also where the VPN service provider obtains backbone service from one or more other service providers.

Within a VPN domain, an instance of routing is used to distribute VPN reachability information among VR routers. Any routing protocol can be used, and no VPN-related modifications or extensions are needed to the routing protocol for achieving VPN reachability. VPN reachability information to and from customer sites can be dynamically learned from the customer equipment using standard routing protocols or it can be statically provisioned on the VR. The routing protocol between the virtual routers and customer equipments is independent of the routing used in the VPN backbone. Furthermore, the routing protocol between the VRs may be the same or it might be different than the routing mechanism used between the customer equipment and the VR.

There are two fundamental architectures for implementing network based VPNs. Those are virtual routers (VR) and piggybacking. The main difference between the two architectures resides in the model used to achieve VPN reachability and membership functions. In the VR model, each VR in the VPN domain is running an instance of a routing protocol responsible to disseminate VPN reachability information between VRs. Therefore, VPN membership and VPN reachability are treated as separate functions, and separate mechanisms are used to implement these functions. VPN reachability is carried out by a per-VPN instance of routing, and a range of mechanisms is possible for determining membership. In the piggyback model the VPN network layer is terminated at the edge of the backbone, and a backbone routing protocol (i.e. BGP-4) is responsible for disseminating the VPN membership and reachability information between provider edge routers (PE) for all the VPNs configured on the PE.

Extranets are commonly used to refer to a scenario whereby two or more companies have network access to a limited amount of each other's corporate data. An important feature of extranets is the control of who can access what data, and this is essentially a policy decision. Policy decisions are enforced at the interconnection points between different domains. The enforcement may be done via a firewall, router with access list functionality, or any device capable of applying policy decision to transit traffic.

In the VR architecture, policy is enforced between two VPNs, or between a VPN and the Internet, in the same manner as is done today without VPNs. For example, two VRs (VPNs) could be interconnected. Each VR locally imposes its own policy controls via a firewall on all traffic that enters its VPN from the outside (whether from another VR or from the Internet). Combining firewalls and exchanging private routes between VRs (members of different VPNs) provide a mechanism to build different flavors of extranets. However, this network-based VPN model has some drawbacks or flaws:

- a Corporations normally apply private address realms in the VPNs, and creating an extranet VPN by tying together two existing VRs, would then create address collisions. Therefore, in this model, each new extranet normally a new set of virtual routers with a separate address realm from any of the intranet VPNs has to be created. This does not only mean an exponential increase in the number of virtual routers, but also that the end stations are required to be associated with at least one IP address for every VPN (intranet and extranet) that it belongs to.
- It is not clearly defined in current network-based VPN models, how security associations, user authentication and ingress filtering is performed of an extranet end station trying to reach a resource or a workgroup member from another partner company.
- The extranet VPN does not take into account the primary access network available to companies, namely their own campus networks. It is natural to think that partner companies will visit each other's sites quite frequently and would therefore like to have the same extranet VPN workgroup access policy apply also internally in the campus network.

This brings us naturally to the question on how workgroups can be applied in campus networks. The current best practice in campus network design is denoted the multilayer model. The multilayer model is designed to encompass the increased usage of central server farms. The traffic pattern in this model is based on having 20 percent of the traffic local to the workgroup LAN and 80 percent of the traffic leaving the workgroup (primarily towards the server farm).

The multilayer model consists of an access, distribution, core and core distribution layer. The access layer is typically based on layer 2 Ethernet switches, each hosting a number of virtual LANs (VLANs). Each virtual LAN is restricted to about 30 employees in order to limit broadcast radiation and broadcast interrupts on end-stations. A typical access layer switch (also called closet node) can host several VLANs, but is often limited to max 100 users. This typically covers one floor in a building. The capacity of today's Ethernet switches is really much higher than the aggregate throughput requirements of 100 users. The reason to limit the number of users to about 100 is primarily related to the impact an access node failure would have on the company as whole or its employees' productivity to be more exact.

The distribution nodes are multilayer switches (layer 2 and 3). Each access layer switch is interconnected to two distribution nodes in order to provide redundancy in case of link failure. As the normal Spanning Tree Protocol (STP) has slow convergence (about 40–50 seconds), most vendors have introduced own schemes (like the UplinkFast feature in Cisco's Catalyst 5000) in order to shorten the VLAN failover time to something like a few seconds. The UplinkFast feature is only applied between two neighbor distribution nodes and is, therefore, not applicable for network-wide redundancy solution. If a switched link layer solution shall be applied for redundancy throughout the network then STP has to be used again. However, generally routing protocols have a better convergence time and are therefore preferred as the network-wide redundancy solution. As an example, OSPF is normally applied to achieve network-wide redundancy in the distribution and core layer. In a big campus network, a building constitutes an OSPF area and the distribution node becomes an area border router to the OSPF backbone. In addition, VRRP or HSRP is applied between two neighbor distribution nodes for the purpose of network layer redundancy towards an access node.

VLAN trunking of individual user VLANs is performed at the access node in order to gather all workgroup LAN access control to the distribution node. VLAN trunking may use an Ethernet Channel (multiple FastEthernet) or a GigEthernet link. The identification in the Access Control List (ACL) is based on VLAN port and MAC address.

The core network can either be based on layer 2 or "vanilla" layer 3 switching. The decision on what to choose is determined by the size of the OSPF backbone. The number of neighbors cannot be more than roughly 100 in current OSPF implementations. There may also be other considerations for segmenting the backbone into several VLANs, e.g. in order to separate management traffic from, RTP services, from HTTP services and so on.

Finally, a new set of distribution nodes are typically placed in front of the server farm and the WAN firewall DMZ respectively. All the server-to-server traffic is then kept off the backbone and VRRP can run in-between a core distribution pair for the purpose of failover protection. The core distribution nodes may also include access control lists.

Each pair of communicating distribution nodes has multiple equal-cost paths to each other. A campus IT-administrator ensures loadbalancing and redundancy from one distribution node to another across the core by running OSPF across these multiple equal-cost paths.

Current workgroup definitions in a campus network are based on the allocation of employees and their MAC addresses into virtual LANs. The user is tied to a LAN workgroup through the port number to which his MAC address is associated. The security restrictions are enforced using Access Control Lists (ACLs) on the distribution node interface towards the access layer.

A campus-wide VLAN model provides the flexibility to have statically configured end stations move to a different floor or building within the campus. When a user plugs-in his PC in a LAN port in another building, the local distribution node will send a query to a VLAN membership policy server to determine access policy and VLAN membership for the user. Then the distribution node adds the user's port to the appropriate VLAN. At the network layer, however, the end station is still required to get a new IP address that conforms to the route aggregation hierarchy of OSPF. This in turn will require the user to restart his session-based applications when changing floor or building.

Furthermore, an access control policy, that is limited to the case of Ethernet link connectivity between the end station and the distribution node, is not generally applicable. It is, e.g., not possible to apply in the case of accessing the Intranet from wide area networks (PPP or IPSec remote access) or via adhoc networks (like Bluetooth). A workgroup policy system based on network layer identities is on the other hand applicable to these cases as well The success factors of extranets in campus networks lie in the provisioning of flexible access to and partial inclusion of personnel and servers in workgroups. This means that:

Persons that shall be part of an extranet workgroup shall be possible to select down to the granularity of individuals;

Server resources from all partners shall be possible to bring into the extranet workgroup; and Extranet workgroup participants shall be able to roam at both, or better any, corporate location while still being granted secure access to the resources and being reachable for other colleagues.

This means that extranet access shall be granted to members both from within the campus and from remote. One special case of the latter is when visiting one of the extranet partner's sites, at which time the workgroup member shall have access to both local and home resources allocated to the extranet workgroup.

So how does the multilayer model map to these requirements? The separation of the access layer from the server farm is a first step. However, the VLAN workgroup access control in the distribution layer is limited to the employees of the company. For extranets, there is a need for a policy management system that controls network resource usage in multiple companies. Furthermore, it is not likely that such an extranet management system will have a hook to every node in the distribution layer, but rather to specialized nodes at the DMZ. The distribution nodes will then need to be instructed to securely tunnel traffic to and from the visiting member up to a gateway node for authentication, filtering and selective tunneling back to the member's home office.

The closest resemblance of a gateway node like this is today's VPN routers. The VPN router can either apply IPSec and/or L2TP tunneling to another site. L2TP has the limitation of requiring link layer access between the end station and the L2TP Access Concentrator (LAC). IPsec is more generally applicable as it can encapsulate IP packets even in multihop access environments, as is the case in the campus environment.

IPSec-based VPN boxes may be instructed to route some traffic locally and other traffic through an IPSec tunnel to another site. Some of them are also equipped with good firewall functionality that is controlled from a central server. What they are lacking in terms of extranet support are:

A management system that helps to decentralize management of extranet workgroups to the involved parties and individuals;

A secure protocol that allows the local VPN gateway to request from the home VPN gateway authentication data on the mobile user and instructions on how to filter and route traffic based on destination and service type;

A dynamic protocol that allows a VPN box to regularly authenticate the guest user to IP address mapping in a non-"service disruptive" fashion; and A NAT-function that can cope with overlapping address realms between members of the extranet, i.e. still providing a unique identity for reachability and filtering purposes.

The following references are also of general interest for the understanding of the present invention:

Bellur, Bhargav et al; Topology Broadcast based on Reverse-Path Forwarding (TBRPF); http://www.ietf.org/internet-drafts/draft-ietf-manet-tbrpf-00.txt; Jul. 2000

Calhoun, Pat et al; DIAMETER Base Protocol; http://www.ietf.org/internet-drafts/draft-calhoun-diameter-17.txt and http://www.diameter.org/; September 2000

Calhoun, Pat et al; DIAMETER Mobile IP Extensions; http://www.ietf.org/internet-drafts/draft-calhoun-diameter-mobileip-11.txt; September 2000

Calhoun, Pat et al; Mobile IP Network Access Identifier Extension for IPv4; RFC2794; http://www.ietf.org/rfc/rfc2002.txt; March 2000

Corson S. et al; Mobile Ad hoc Networking (MANET): Routing Protocol Performance Issues and Evaluation Considerations; RFC2501; http://www.ietf.org/rfc/rfc2501.txt; January 1999

Harkins, D. et al; The Internet Key Exchange (IKE); RFC2409; http://www.ietf.org/rfc/rfc2409.txt; November 1998

Kent, S. et al; Security Architecture for the Internet Protocol; RFC2401; http://www.ietf.org/rfc/rfc2401.txt; November 1998

Kent, S. et al; IP Encapsulating Security Payload (ESP); RFC2406; http://www.ietf.org/rfc/rfc2406.txt; November 1998

Kent, S. et al; IP Authentication Header; RFC2402; http://www.ietf.org/rfc/rfc2402.txt; November 1998

Knight, S et al; Virtual Router Redundancy Protocol; RFC2338; ftp://ftp.isi.edu/in-notes/rfc2338.txt; April 1998

Montenegro, G.; Reverse Tunneling for Mobile IP; RFC2344; http://www.ietf.org/rfc/rfc2344.txt; May 1998

Perkins, Charlie; IP Mobility Support; RFC2002; http://www.ietf.org/rfc/rfc2002.txt; October 1996

Perkins, Charlie et al; Ad hoc On-demand Distance Vector (AODV) Routing; http://www.ietf.org/internet-drafts/draft-ietf-manet-aodv-06.txt; July 2000

SUMMARY OF INVENTION

The present invention describes a network-based mobile workgroup system allowing a selected set of users from two or more mobile virtual private networks to form an extranet workgroup in a secure manner.

FIG. 2 shows the tunnel structure that is established in order to allow two mobile nodes 3a and 3b to be part of the same extranet workgroup in a secure manner. The mobile nodes 3a and 3b are belonging to an extranet workgroup. They retrieve a list of workgroup members 26 by doing HTTPS requests 22a and 22b to the mobile service manager 7 and its portal. For each workgroup participant a triplet including the user fully qualified domain name 155b/155a, the mobile node 3 private IP address (10.0.0.1) and the virtual home agent's 1a/1b public IP address (204.8.9.1 and 204.8.8.1 respectively). The triplets are retrieved at sign-on to the extranet workgroup and can be updated regularly through a push or pull procedure from the mobile service manager 7 portal.

The initiating party (mobile node 3a) establishes a unidirectional IPSec tunnel 43a with the virtual home agent 1b for traffic going towards the mobile virtual private network that is hosted by 1b. Similarly the target party (mobile node 3b) establishes a unidirectional IPSec tunnel 43b with the home agent 1a for traffic going towards the mobile virtual private network that is hosted by 1a. These tunnels are encapsulated by a mobile IP tunnel 53a/53b established from the shared foreign agent 2a and the individual virtual home agents 1a and 1b of each mobile virtual private network. Finally an IP—IP tunnel 53c is established between the two virtual home agents 1a and 1b as part of the extranet workgroup configuration from the mobile service manager 7.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks and components are shown in many of the figures, those skilled in the art will appreciate these functions may be performed by software modules or programs executed using a suitably programmed digital microprocessor or general purpose computer by individual hardware circuits, by an application specific integrated circuit (ASIC), and/or by one or more digital signaling processors (DSPs).

FIG. 3 is a flow chart diagram illustrating the payload header of packets sent between the foreign agent and the home agent in order to support extranet workgroups in a network-based mobile virtual private network.

FIG. 6b is a flow chart diagram illustrating the internal message flow in the virtual home agent that is hosting the corresponding node, which a mobile node request extranet access to.

FIG. 10b is a flow chart diagram illustrating an extension to the Ad-hoc On-demand Distance Vector (AODV) protocol for fast handover.

FIG. 10c is a function block diagram illustrating the format of the AODV authentication header extension.

DETAILED DESCRIPTION OF THE DRAWINGS

In the following description, for purposes of explanation and not limitation, specific details are set forth, such as particular embodiments, circuits, signal formats, techniques, etc. in order to provide a thorough understanding of the present invention. Although specific protocols are referred to for purposes of facilitating the description, the present invention is not necessarily limited to such specific protocols. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

The present invention describes a network-based mobile workgroup system allowing a selected set of users from two or more mobile virtual private networks to form an extranet workgroup in a secure manner.

The invention is based on the limited private address scenario, which entails the following:

Mobile nodes have private addresses as defined in RFC 1918;
Mobile nodes, having overlapping addresses may visit the same foreign agent;
Mobile nodes support reverse tunneling;
Each (virtual) home agent has a public IP address;
Each (virtual) home agent is dedicated to one mobile virtual private network (M-VPN);
Shared foreign agents have public IP addresses;
Dedicated foreign agents may have IP addresses from the particular M-VPN realm;
A mobile service manager has a public IP address; and
A mobile node has a UFQDN (user fully qualified domain name) within the operator domain.

The main benefits, compared to existing solution for extranet workgroup creation, can be summarized as:

Extranet support despite overlapping address realms;
Flexible workgroup creation with any set of users from any set of M-VPNs;

Supports peer-to-peer M-VPN applications between mobile clients;

Per packet authentication and filtering by ingress M-VPN security gateway; and

Delegated responsibility to each M-VPN to allocate resources to extranet workgroup.

Figure 1:
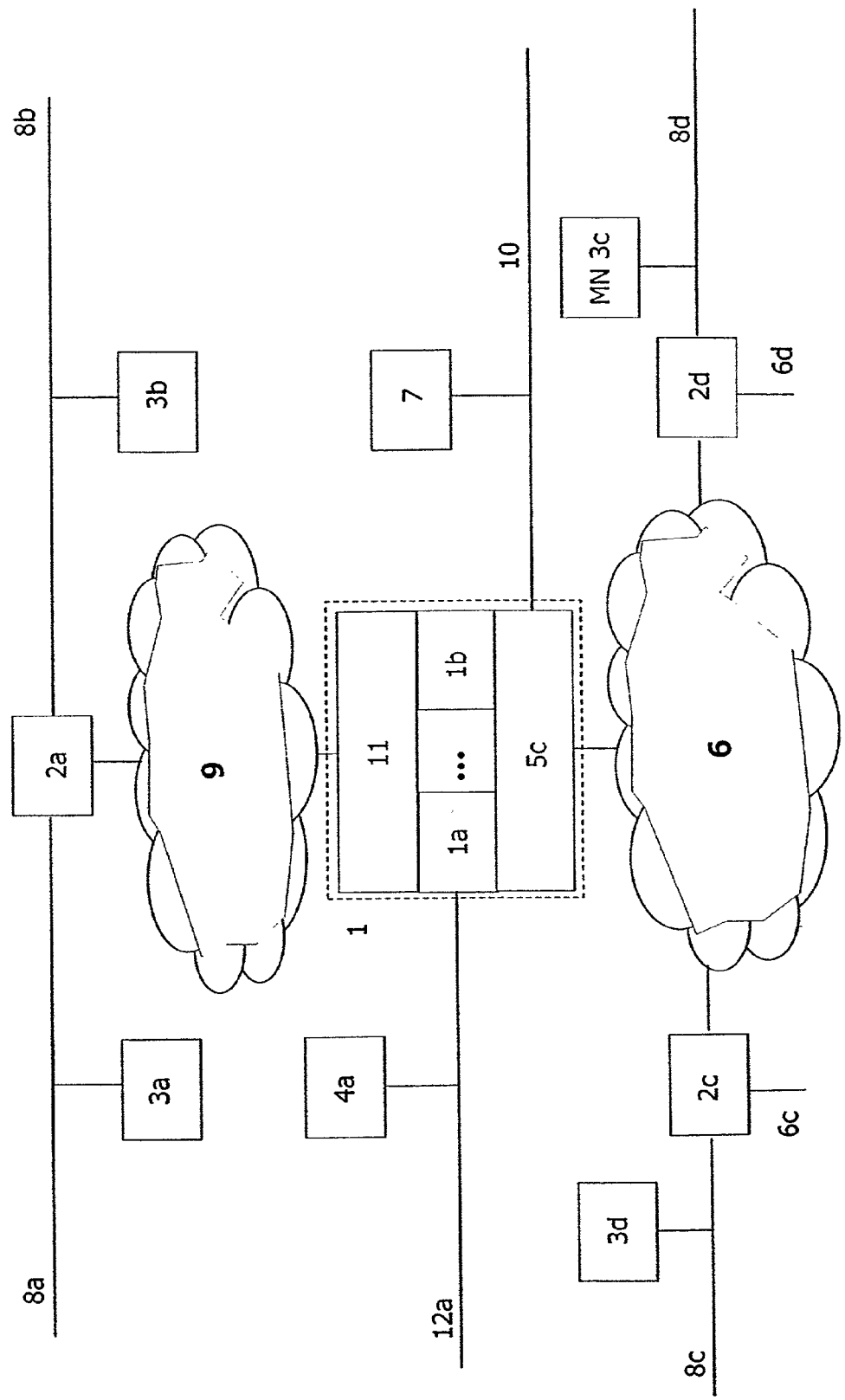
FIG. 1 is a function block diagram illustrating the components in a network-based mobile virtual private network.

FIG. 1 illustrates the placement of the home agent 1 in the operator network. The operator can either be a cellular operator with its own access network 9 or an Internet Service Provider acting as a virtual operator with no own access network 9. In the case of a cellular operator, a foreign agent 2a will be shared for all mobile virtual private network customers. The foreign agent 2a may host multiple visited network segments 8a and 8b to which any number of mobile nodes 3a and 3b may attach. Yet again, it is important to note that the mobile nodes 3a and 3b may belong to different companies and, therefore, different mobile virtual private networks.

The home agent 1 consists of one or more virtual home agents 1a, 1b, etc. Each virtual home agent has all the components of a physical home agent. A virtual router dispatcher 11 is placed in front of the virtual home agents 1a and 1b, in order to distribute datagrams internally in the home agent 1 based on destination IP address. Each virtual home agent 1a and 1b has a public IP address for this purpose. Each virtual home agent 1a and 1b has a physical or virtual home network. This is exemplified by the physical home network 12a associated with the virtual home agent 1a.

The home agent 1 also contains a backbone virtual router 5c that act as the common gateway towards the Internet 6 for all virtual home agents 1a and 1b. The backbone virtual home agent 5c also hosts a management network 10 to which a mobile service manager 7 for the mobile workgroup system is attached. The mobile service manager 7 contains among other things a portal for workgroup membership list retrieval. The workgroup membership list is used in this invention to handle communication between workgroup members belonging to different address realms (mobile virtual private networks). However, it has also a more general appeal as a member list for creating any type of conference calls within the workgroup (e.g. by using Microsoft Netmeeting).

The home agent 1 is, furthermore, connected via the Internet 6 to the Intranet 6c and 6d of each company that have outsourced its mobile virtual private network. The operator has placed a foreign agent 2c and 2d at each corporate site in order to allow access to the mobile workgroup system from the Intranets 6c and 6d. Moreover, the foreign agents 2c and 2d provide independent visited networks 8c and 8d at each site at which any mobile node 3c and 3d within the mobile workgroup system can attach. This means that a mobile node 3c from one Intranet 6c can visit the corporate site of another Intranet 6d, if the two companies are part of a common mobile workgroup system. Note that the visited networks 8c and 8d may very well be implemented as logical networks (e.g. virtual local area networks, VLAN, or IP—IP tunnels) in the existing physical infrastructure of the Intranets 6c and 6d respectively. This eliminates costly new cabling at the site and increases the reach of the visited networks 8c and 8d in the campus.

Figure 2:
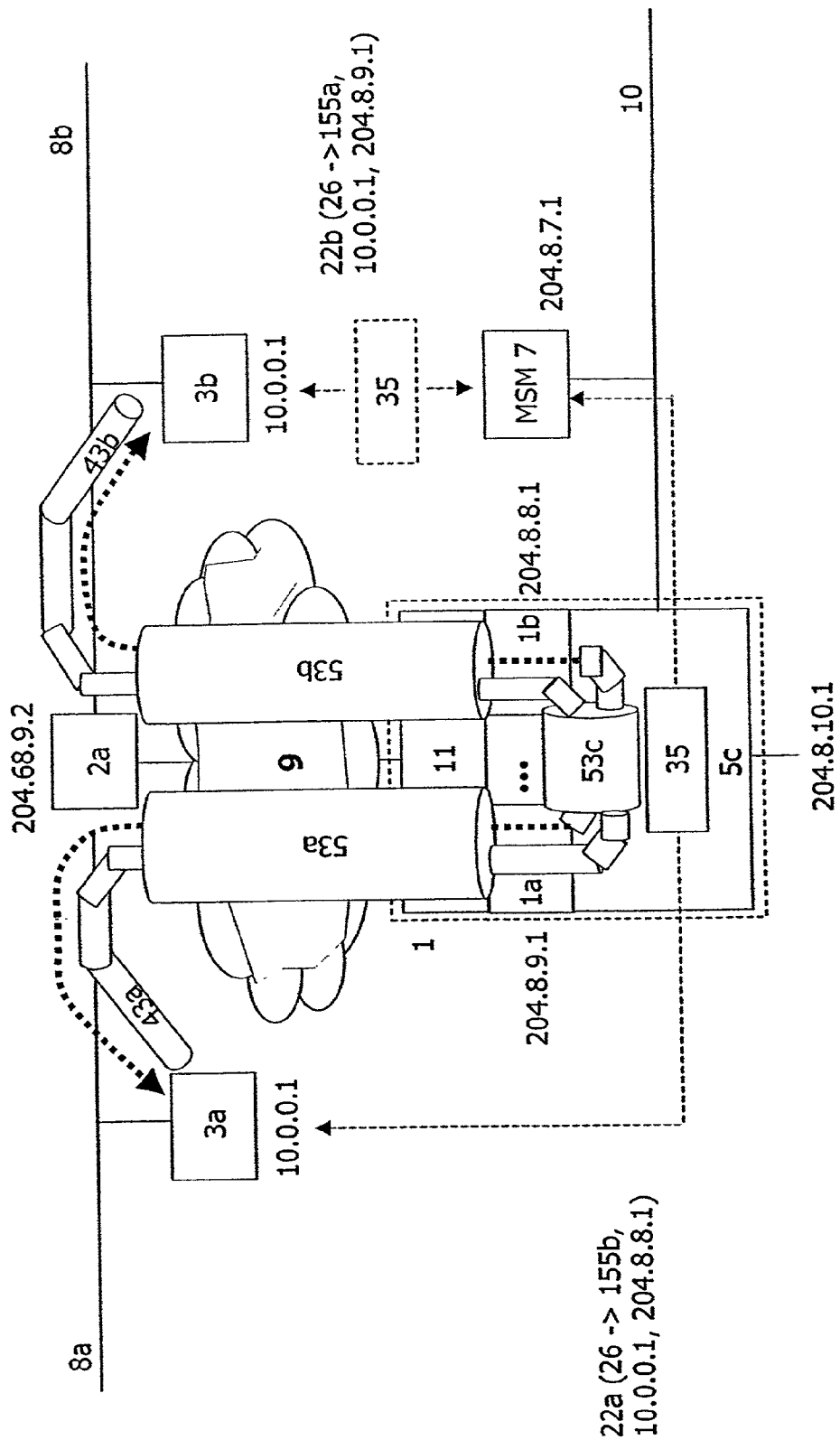
FIG. 2 is a function block diagram illustrating tunnel structure applied to support extranet workgroups in a network-based mobile virtual private network.

FIG. 2 shows the tunnel structure that is established in order to allow two mobile nodes 3a and 3b to be part of the same extranet workgroup in a secure manner. Note that both mobile node 3a and 3b are given the IP address 10.0.0.1 as their mobile virtual private networks have overlapping address realms. The foreign agent 2a is given a public IP address 204.68.9.2 as is the two virtual home agents 1a and 1b. Virtual home agent 1a has IP address 204.8.9.1 and virtual home agent 1b has IP address 204.8.8.1. Equally important is that the mobile service manager 7 is given a public IP address 204.8.7.1 that is unique across both mobile virtual private network realms.

The mobile nodes 3a and 3b that are belonging to an extranet workgroup retrieve a list of workgroup members 26 by doing HTTPS requests 22a and 22b to the mobile service manager 7 and its portal. For each workgroup participant a triplet including the user fully qualified domain name 155b/155a, the mobile node 3 private IP address 156a/b (10.0.0.1) and the virtual home agent's 1a/1b public IP address 157a/b (204.8.9.1 and 204.8.8.1 respectively). The triplets are retrieved at sign-on to the extranet workgroup and can be updated regularly through a push or pull procedure from the mobile service manager 7 portal. A network address port translator 35 in the backbone virtual router 5c allows for the traversal of the HTTPS requests 22a and 22b from the mobile nodes 3a and 3b to the mobile service manager 7.

The initiating party (mobile node 3a) establishes a unidirectional IPSec tunnel 43a with the virtual home agent 1b for traffic going towards the mobile virtual private network that is hosted by 1b. Similarly the target party (mobile node 3b) establishes a unidirectional IPSec tunnel 43b with the home agent 1a for traffic going towards the mobile virtual private network that is hosted by 1a. These tunnels are encapsulated by a mobile IP tunnel 53a/53b established from the shared foreign agent 2a and the individual virtual home agents 1a and 1b of each mobile virtual private network. Finally an IP—IP tunnel 53c is established between the two virtual home agents 1a and 1b as part of the extranet workgroup configuration from the mobile service manager 7.

FIG. 3 shows the header format of payload datagrams that are sent between the foreign agent 2a and the home agent 1 across the access network 9. The top part shows the header of datagrams sent from the mobile node 3a and the bottom part shows the header of datagrams sent to the mobile node 3b. The number 40x denotes a destination IP address, while the number 41x denotes source IP address. Xa denotes the outer header, Xb the intermediate header, and Xc the inner IP header. An IPSec header 43 is placed in between the intermediate Xb and inner Xc IP header. The IPSec header 43 can either have the format of an authentication header (AH) 45 or the format of an encryption security payload (ESP) header 44 depending on security policy. Note especially that the intermediate header Xb involves the stable IP address of the mobile node 3a, which ensures that no renegotiation of the security association with the virtual home agent 1b of the other mobile virtual private network is required only because the mobile node 3a is changing subnetwork during the session with mobile node 3b.

Figure 4A:
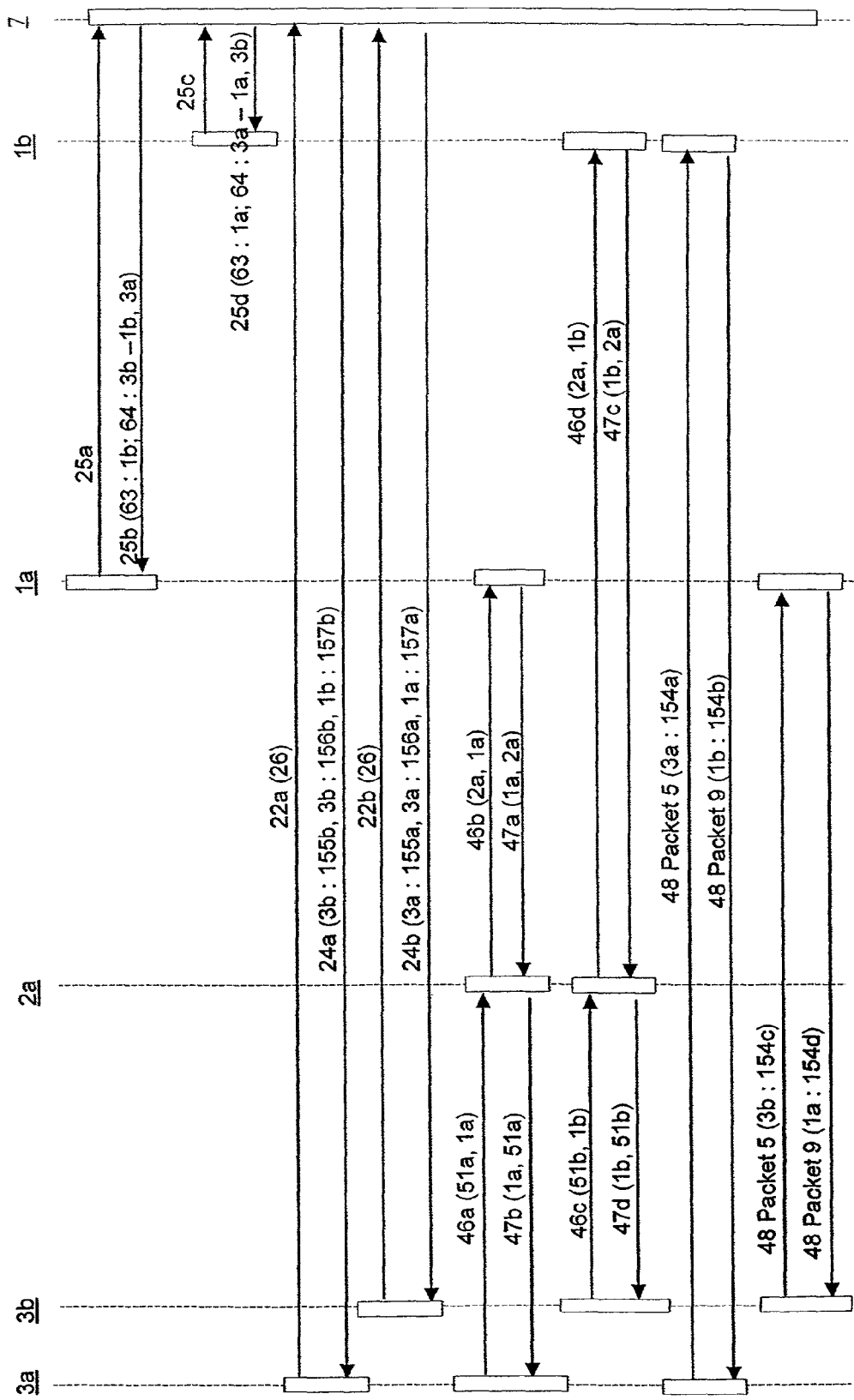
FIG. 4a is a flow chart diagram illustrating registration message flow in order to support extranet workgroups in a network-based mobile virtual private network.

FIG. 4a illustrates the registration procedure message flow when creating an extranet workgroup in a network-based mobile workgroup system, i.e. a workgroup with participants from more than one mobile virtual private network. The virtual home agents 1a and 1b are using the lightweight directory access protocol (LDAP) 25 to retrieve the extranet workgroup configurations. The virtual home agent 1a sends an LDAP request 25a to the mobile service manager 7. The mobile service manager 7 replies with an LDAP answer 25b including any static routes 63 and filter states 64 to be applied to the workgroup traffic. In this particular example, the static route 63 points to the virtual home agent 1b of the other mobile virtual private network having members involved in the extranet workgroup. The filter states 64 are given for each member of the workgroup 3*a* and 3*b*. In the case of workgroup members not part of the own mobile virtual private network, a realm-indexed is also supplied. In the case of mobile node 3*b*, this realm-index is the virtual home agent 1*b*, i.e. the home agent of the mobile virtual private network to which mobile node 3*b* belongs. Virtual home agent 1*b* is then configured in a similar manner using LDAP request 25*c* and answer is 25*d*.

The mobile nodes 3*a* and 3*b* within the extranet workgroup asks for the workgroup member list 26 as part of a HTTPS request 22*a*/22*b*. The mobile service manager 7 responds with giving the triplets (the user fully qualified domain name 155 and private IP address 156 of the mobile node 3 as well as its virtual home agent 1 public IP address 157) for each workgroup member. This means that mobile node 3*a* receives the triplets for mobile node 3*b* and vice versa.

As in the normal mobile IP registration procedure, the mobile node 3*a* sends a registration request 46*a* with only its MAC address 51*a* as source and its virtual home agent 1*a* as destination to the foreign agent 2*a*. The foreign agent 2*a* forwards the registration request 46*b* further to the virtual home agent 1*a*. The registration reply 47*a* is sent from the virtual home agent 1*a* to the foreign agent 2*a* and forwarded to the mobile node 3*a* in the form of registration reply 47*b*. The next sequence shows the corresponding procedure for mobile node 3*b*. Note that both mobile nodes are capable of using the same foreign agent 2*a*.

The initiating party (mobile node 3*a*) has now all the information and tunnel configuration information for initializing a security association with the virtual home agent 1*b* acting as security gateway for the mobile virtual private network in which the target party (mobile node 3*b*) is situated. This is performed using the Internet Key Exchange (IKE) protocol 48. In FIG. 4*a* it is assumed that the mobile node 3*a* and the virtual home agent 1*b* has been configured with their own certificates 154*a* and 154*b* respectively. This opens up for exchanging the certificates by piggybacking them in the IKE 48 packet 5 and 9 respectively. Similarly the certificate 154*c* for the target party (mobile node 3*b*) is sent as part of IKE 48 to the security gateway of the initiating party's (mobile node 3*a*) mobile virtual private network (virtual home agent 1*a*) and vice versa. The certificates of the mobile nodes 3*a* and 3*b* are extended compared to the basic X.509v3 certificate by adding their virtual home agent's public IP address (1*a* and 1*b* respectively) as part of the Subject Alternative Name field. This is done in order for creating a unique identity for the security association (mobile node private IP address and security gateway public IP address) that can be matched by the incoming IP—IP encapsulated IPSec datagrams. How this works will be explained in more details in FIGS. 6*a* and 6*b*.

Figure 4B:
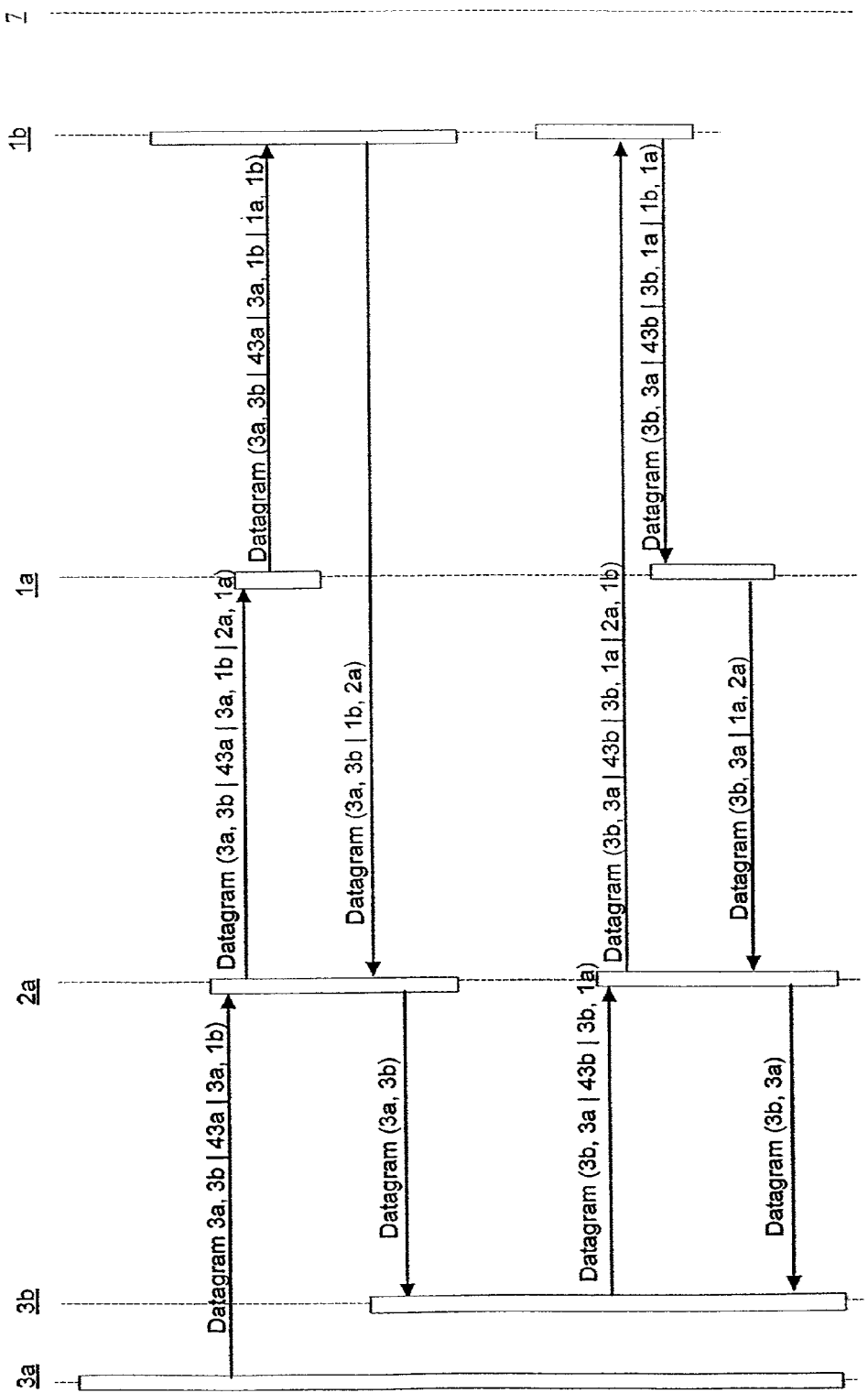
FIG. 4b is a flow chart diagram illustrating the data sending message flow in order to support extranet workgroups in a network-based mobile virtual private network.

FIG. 4*b* illustrates the message flow for sending a datagram from the mobile node 3*a* to the mobile node 3*b* and back. More specifically, it shows the source and destination IP address of each header of the packet starting with the inner packet header at the leftmost position.

Figure 5:
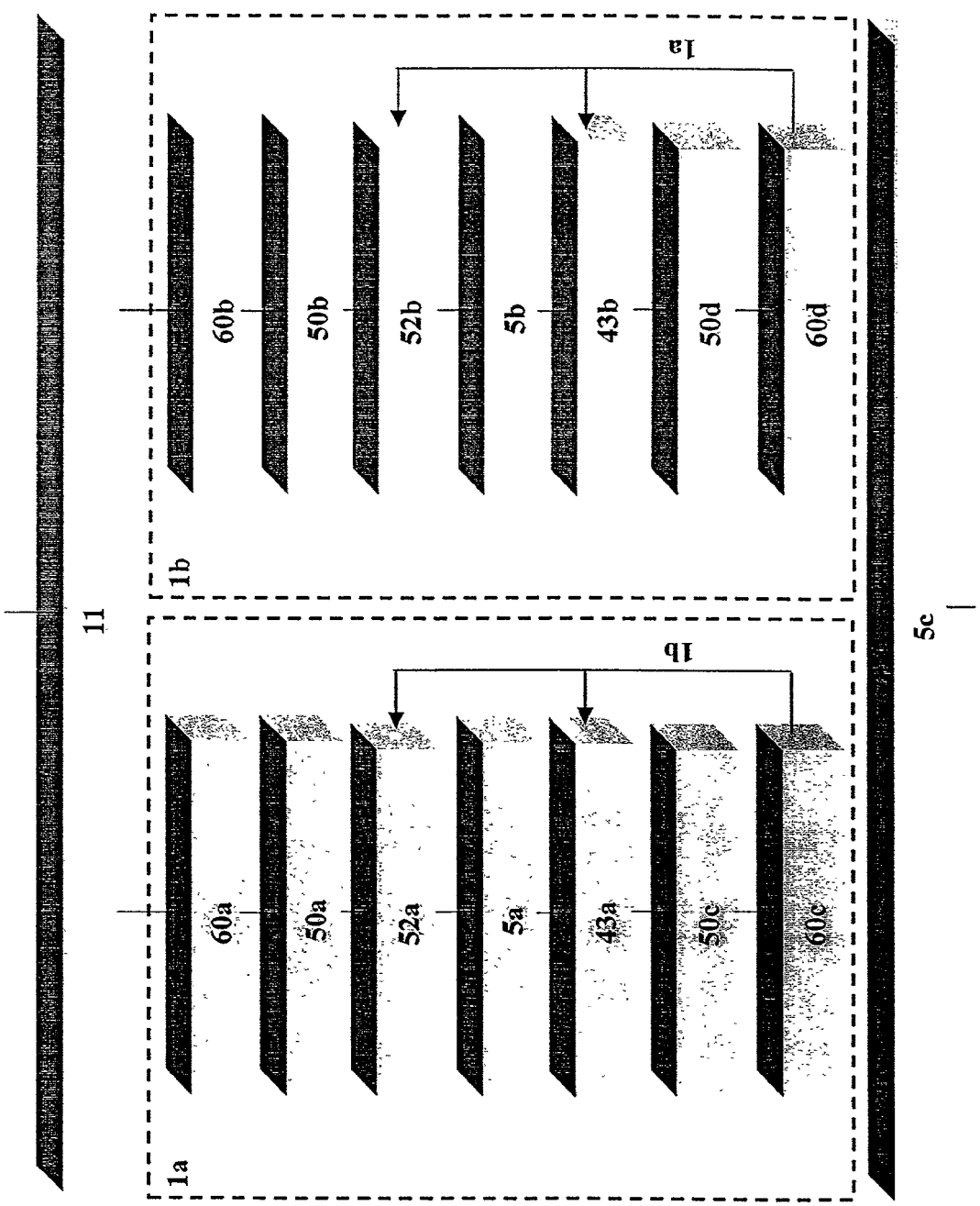
FIG. 5 is a function block diagram illustrating the components of a home agent system in a network-based mobile virtual private network.
Figure 6A:
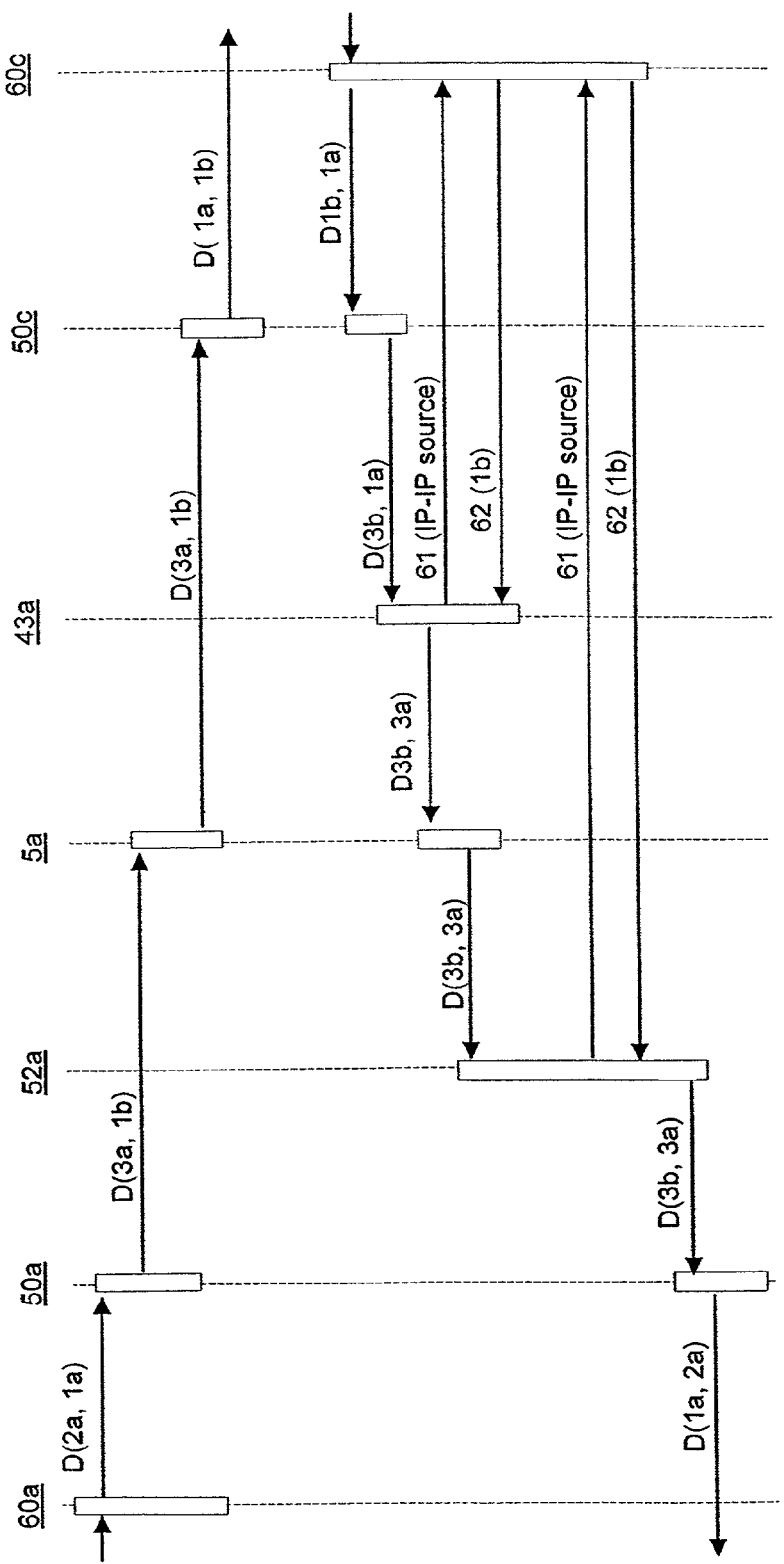
FIG. 6a is a flow chart diagram illustrating the internal message flow in the virtual home agent that is hosting the mobile node, which in turn request extranet access.
Figure 6B:
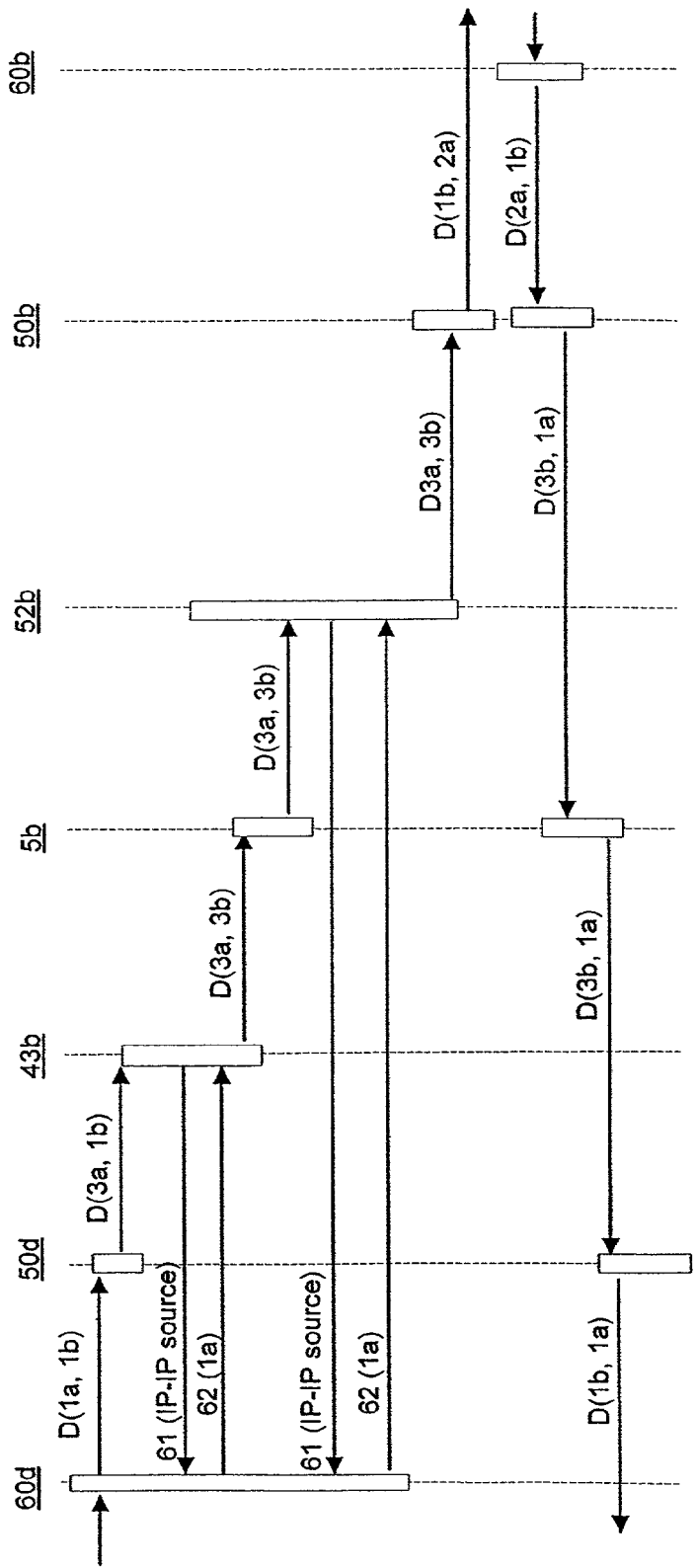

FIG. 5 is the function block diagram of the home agent 1 and its individual components. The virtual router dispatcher 11 and the backbone virtual router 5*c* are shown as border components in the virtual home agent 1. The left column shows the individual components of the virtual home agent 1*a* and the right column shows the corresponding components of the virtual home agent 1*b*. The buffer 60*a*/*b*/*c*/*d* is placed at the entry point of the virtual home agent 1*a*/1*b*. An incoming datagram is stored in total in the buffer including all its IP header information. As shown by the arrows, two of the other blocks (IPSec 43*a*/*b* as well as the firewall 52*a*/*b*) are using the buffer 60*c* and 60*d* to fetch a realm-index (the virtual home agent IP address 1*b*/1*a*). As shown in FIGS. 6*a* and 6*b*, the virtual home agent IP address 1*b*/1*a* is always part of the datagram entering a virtual home agent from another mobile virtual private network in the form of a source IP address in an IP—IP tunnel between the two virtual home agents 1*a* and 1*b*. 50*c* and 50*d* are the two termination modules for this IP—IP tunnel. An additional set of IP—IP tunnel terminations 50*a*/*b* are shown at the upper part of the stack fronting the virtual router dispatcher 11 (and the foreign agent 2*a*—not shown in the picture). These IP—IP tunnel terminations relates to mobile IP.

The center module of a virtual home agent 1*a*/*b* is the virtual router 5*a*/*b*. The virtual router is making nexthop decisions for datagrams passing through the virtual home agent 1*a*/*b*. It is realm-specific to the mobile virtual private network that the virtual home agent 1*a*/*b* belongs to, and in such away can only route packets that either has public destination IP addresses or private IP addresses that belong to the address realm of its mobile virtual private network.

FIG. 6*a* is a flow chart diagram illustrating the internal message flow in virtual home agent 1*a* when a datagram arrives at the buffer 60*a* facing the foreign agent 2*a*. This is exemplified in the sequence diagram by having the initiating party (mobile node 3*a*) send a datagram towards the target party (mobile node 3*b*). The buffer 60*a* will store the whole datagram. The datagram will then be sent to the mobile IP IP—IP tunnel termination 50*a* where one header is stripped off. The datagram proceeds to the virtual router 5*a*. The virtual router 5*a* takes a forwarding decision based on the destination IP address in the datagram header, in this case the public IP address of the virtual home agent 1*b*. The forwarding table in the virtual router 5*a* has a route for 1*a* with nexthop being the logical IP—IP interface 50*c*. The datagram is, therefore, sent out on this interface, which adds a new header to the datagram with source IP address as virtual home agent 1*a* and destination address as virtual home agent 1*b*.

The lower part of the sequence diagram shows the activities performed in the virtual home agent 1*a* when a datagram is coming in on the buffer 60*c* facing the virtual home agent 1*b*. This is exemplified in the sequence diagram by having the target party (mobile node 3*b*) send a datagram towards the initiating party (mobile node 3*a*). Here again, the buffer 60*c* will store the whole datagram and send it to the logical IP—IP interface 50*c*. The IP—IP termination 50*c* will strip off the outer IP header and discover that the inner header requires IPSec decryption. The datagram is, therefore, sent to the IPSec module 43*a*. As the source header (mobile node 3*b*) is not unique (private IP address from another address realm), there is a need for the IPSec module 43*a* to query 61 the buffer 60*c* for the source address of the original incoming datagram. The reply message 62 will include the public address of the virtual home agent 1*b* (i.e. the security gateway of mobile node 3*b*). Note that in an actual implementation, sharing information from the buffer 60*c* to the IPSec module 43*a* may be solved by a common data structure. In any way, the tuplet mobile node 3*b* private IP address and virtual home agent 1*b* public IP address) will now uniquely match with the security association established using the mobile node 3*b* certificate and the initial IKE procedures 48. The datagram can be decrypted and sent to the virtual router 5*a* for route lookup based on the destination IP address. In this case the destination IP address is mobile node 3*a*, which happens to be private but part of the address realm for which the virtual router 5*a* is allocated.

The virtual router 5a can in other words make a correct forwarding decision and the nexthop is the logical IP—IP interface 50a for mobile IP encapsulation. However, before that can be performed some security procedures will need to be performed. The reason for this is that datagram is now entering into the mobile virtual private network of virtual home agent 1a, and as such has to be filtered by the firewall 52a. In the same way as the IPsec module 43a could not uniquely apply filtering merely on the source IP address of mobile node 3b, this also applies to the firewall 52a. The firewall 52a will, therefore, query 61 the buffer 60c for the outer source IP address of the original incoming datagram (in this case the virtual home agent 1b public IP address) and apply it as realm-index in the workgroup filter. The datagram will pass the firewall 52a as the mobile node 3a is from the M-VPN, that is hosted by the security gateway 1b, and in addition is part of the extranet workgroup in which the destination IP address (mobile node 3a) is also a member in. The datagram is now sent to the logical IP—IP interface 50a for mobile IP encapsulation and sent towards the foreign agent 2a.

FIG. 6b describes the exact same behavior in the virtual home agent 1b with the mere difference that IPSec decryption 43b and firewall-filtering 52b is performed on the datagram sent from the initiating party (mobile node 3a) to the target party (mobile node 3b) instead. As the sequence diagram and numbering is similar to FIG. 6a, it is not described again.

Figure 7:
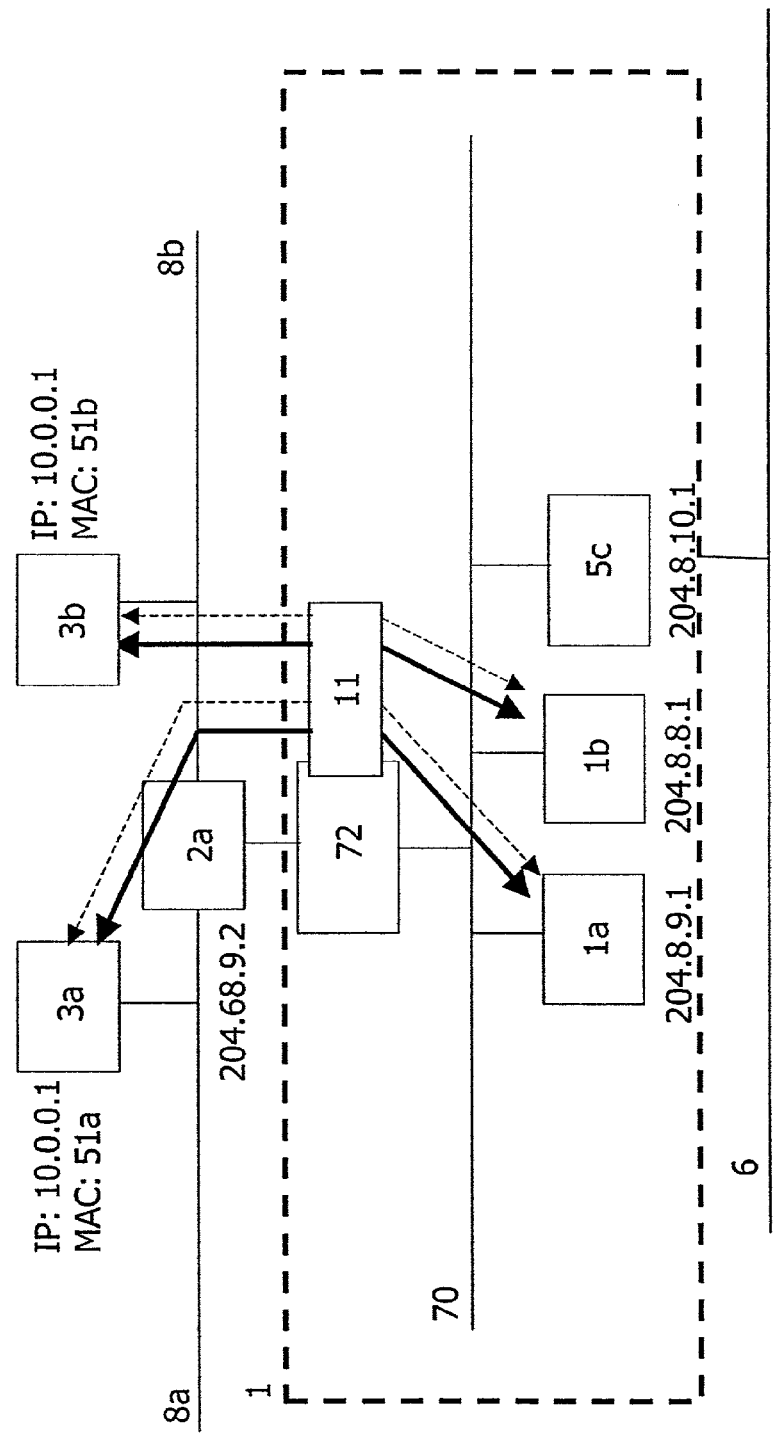
FIG. 7 is a diagram illustrating the virtual router dispatcher in a network-based home agent.

FIG. 7 is a function block diagram illustrating the internal of the home agent 1 in regards to the virtual router dispatcher 11. The virtual router dispatcher is hosted by the interface 72 facing the shared foreign agent 2a. Incoming packets are tunneled using mobile IP with destination address set to one of the virtual home agents 1a (204.8.9.1) or 1b (204.8.8.1). These addresses are public and, therefore unique, across all M-VPN address realms. The virtual router dispatcher can, therefore, use the destination IP address of the datagram to forward the datagram to the correct virtual home agent 1a or 1b across the internal home agent network 70. In fact the virtual router dispatcher 11 does not only work with mobile IP tunneled datagrams, but can also be applied to any incoming datagram with a public IP address. Those datagrams with a destination IP address not matching a virtual home agent 1a or 1b, are then sent to the backbone virtual router 5c for further forwarding out on the Internet 6.

One aspect in FIG. 7 is the overlapping private IP addresses of the mobile nodes 3a (10.0.0.1) and 3b (10.0.0.1). This comes from the fact that they belong to different M-VPNs and, therefore, different address realms. As can be seen from the FIG. 7, foreign agent 2a has a publicly routable IP address (204.68.9.2). The datagrams, sent from anyone of the virtual home agents 1a or 1b, will be encapsulated using the foreign agent 2a IP address (204.68.9.2) as destination and the virtual home agent IP address as source (i.e. 204.8.9.1 for mobile node 3a and 204.8.8.1 for mobile node 3b). It is the foreign agent 2a that will distinguish which datagrams that shall be sent to mobile node 3a and 3b respectively. This is based on mapping the private mobile node address and public virtual home agent IP address to the unique link layer MAC address. The distribution across the visited network 8a and 8b will be based on the MAC address of the mobile node (i.e. 51a for mobile node 3a and 51b for mobile node 3b).

Figure 8:
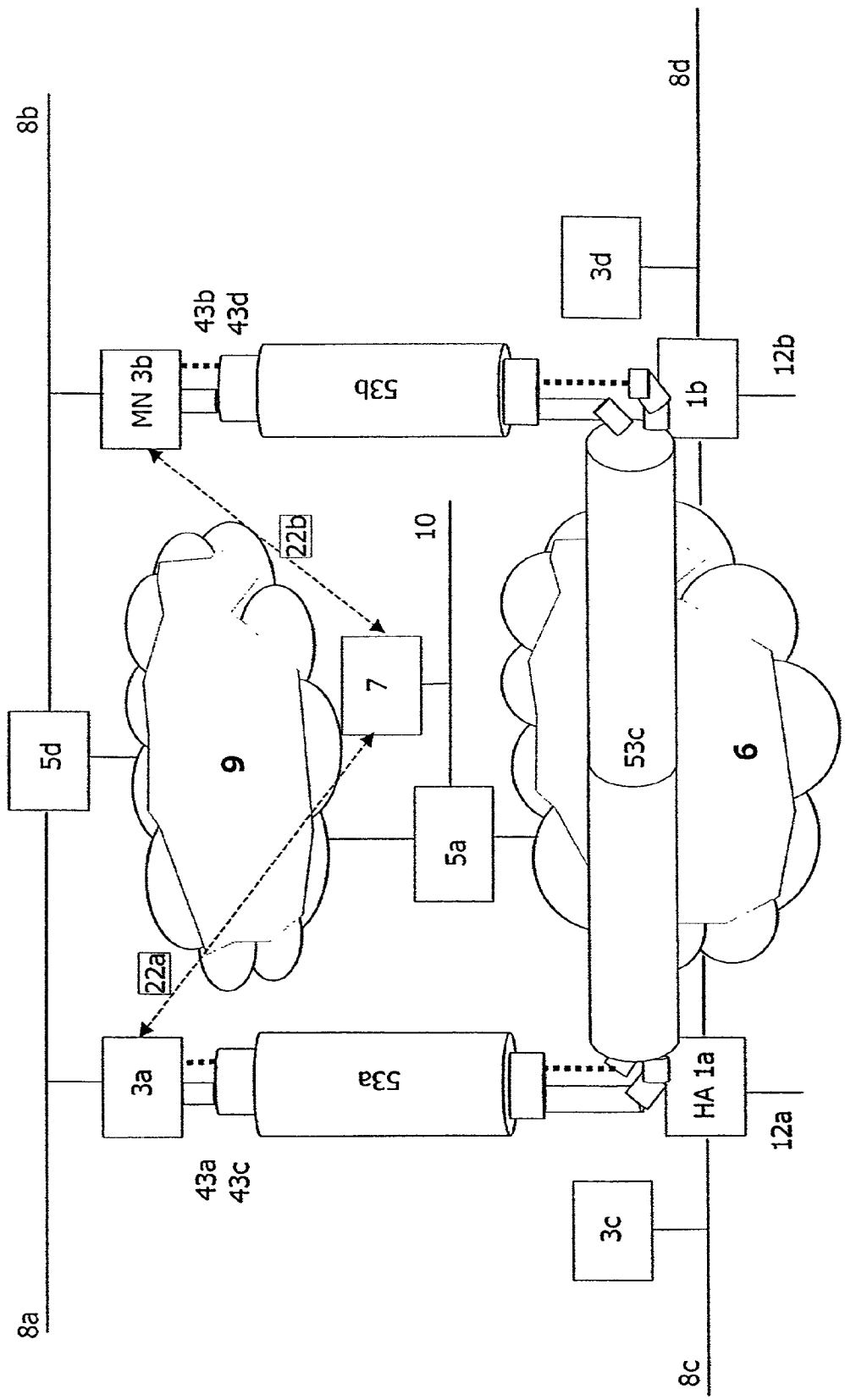
FIG. 8 is a diagram illustrating the tunnel structure used to support extranet workgroups in case of mobile nodes using co-located care of address and home agents being placed at the customer premises.

The description so far has been based on having the home agent 1 placed in the operator-domain, and hosting a number of virtual home agents exemplified by 1a and 1b. There are clearly some advantageous of such a network deployment scenario, where the most notable is optimal routing between mobile nodes 1a and 1b in case both are within the operator's access network 9. In FIG. 8 it is described how extranet workgroups can be supported also in the case of having the home agents 1a and 1b physical rather than virtual and deployed at the enterprise network border rather than in the operator's core network. There are several advantageous with such a design as well, where the two most important are simplicity in home agent design and complete enterprise control of M-VPN security instead than having the control outsourced to an operator. These arguments are mostly applicable for larger campus networks. Roaming into these types of networks is, therefore, described in more detail in the next set of figures.

FIG. 8 combines the campus-based home agent 1a and 1b with the notion of co-located care-of address on the mobile nodes 3a and 3b. The co-located care-of address is an option in the mobile IP standard, and applied in case the visited network 8a and 8b does not have a foreign agent 2a available. In this case only a router 5d is available on the visited subnetworks 8a and 8b. The co-located care-of address is a last resort option and has several disadvantages compared to having a foreign agent 2a present. The two most important aspects relate to having two extra tunnel headers IPsec 43c and MIP 53a all the way out to the mobile node 3a as well as using up a public IP address as a care-of address for every mobile node. Nevertheless, the co-located care-of address is an important option to achieve widespread coverage for the extranet workgroup service. Also, using header compression schemes, like the IP header compression as defined in RFC 2507, can reduce some of the extra overhead induced by co-located care-of address on the access link towards the mobile node 3a.

In the campus-based home agent design, the Intranets 6a and 6b can safely be defined as home networks 12a and 12b. Instead of having an internal IP—IP tunnel between two virtual home agents inside an operator-placed home agent 1, an IP—IP tunnel 53c traversing the Internet 6 is established between the two home agents 1a and 1b that have mobile nodes 3a and 3b being part of the extranet workgroup. Note that an IPSec tunnel could very well replace the IP—IP tunnel 53c. But that it is technically not required in this particular scenario as there is always an inner IPSec security association between the sending mobile node, e.g. mobile node 3a, and the security gateway of the receiving M-VPN, in this case home agent 1b.

There are several different alternatives for securing the co-located care-of address scenario.

One alternative is to apply IPSec directly on the mobile IP tunnel 53a with the temporary co-located care-of address and the home agent IP address as endpoints. This requires, however, a new IKE 48 exchange at each handover as the co-located care-of address then is changing.

Another alternative is to rely on link layer security. However, this requires the placement of the home agent 1 with link layer contact to the visited subnetwork 8a if complete end-to-end security shall be fulfilled.

The third alternative is to apply an end-to-end IPSec security association between mobile nodes 3a and 3b. However, this prevents the home agents 1a and 1b from performing any workgroup filtering based on other aspects than mobile node IP address as all other information is encrypted (e.g. protocol type, TCP/UDP port number, etc).

The last, and selected, alternative is shown in FIG. 8 and involves adding an extra IPSec security association between the stable home address of the mobile node 3a and the home agent IP address 1a. Both are in the same M-VPN address realm, so this causes no problem. It creates, however, some extra overhead on the access link. Overall, though, it is considered the best solution. Note also that any solution for traversing mobile IP 53a through a network address port translator (NAPT) will automatically also solve the problem of traversing the IPSec tunnel 43c across the same NAPT.

As pointed out in the description of current state of the art, a mobility-aware, and security conscious, network-layer is the obvious missing piece for campus-wide mobility to be a reality. This missing piece can either be implemented using mobile IP, mobility routing or a combination of the two. The following invention applies a combination of the two, i.e. mobility routing is applied as the intra-domain routing protocol and mobile IP as the inter-domain routing protocol. The reason being that mobile IP is applying a tunneling technique that has scalability characteristics already well-proved in other wide-area mobile systems, but introduces a complexity of tunnel management not suitable for dense campus networks. Mobility routing, with its flat topology and reactive routing scheme, has on the other hand the flexibility required for the adhoc mobility behavior one can expect in a campus area. Furthermore, the following invention suggests a proactive route update extension for active sessions in order to provide the foundation for a fast handover procedure necessary for real-time critical applications such as voice of IP.

Figure 9:
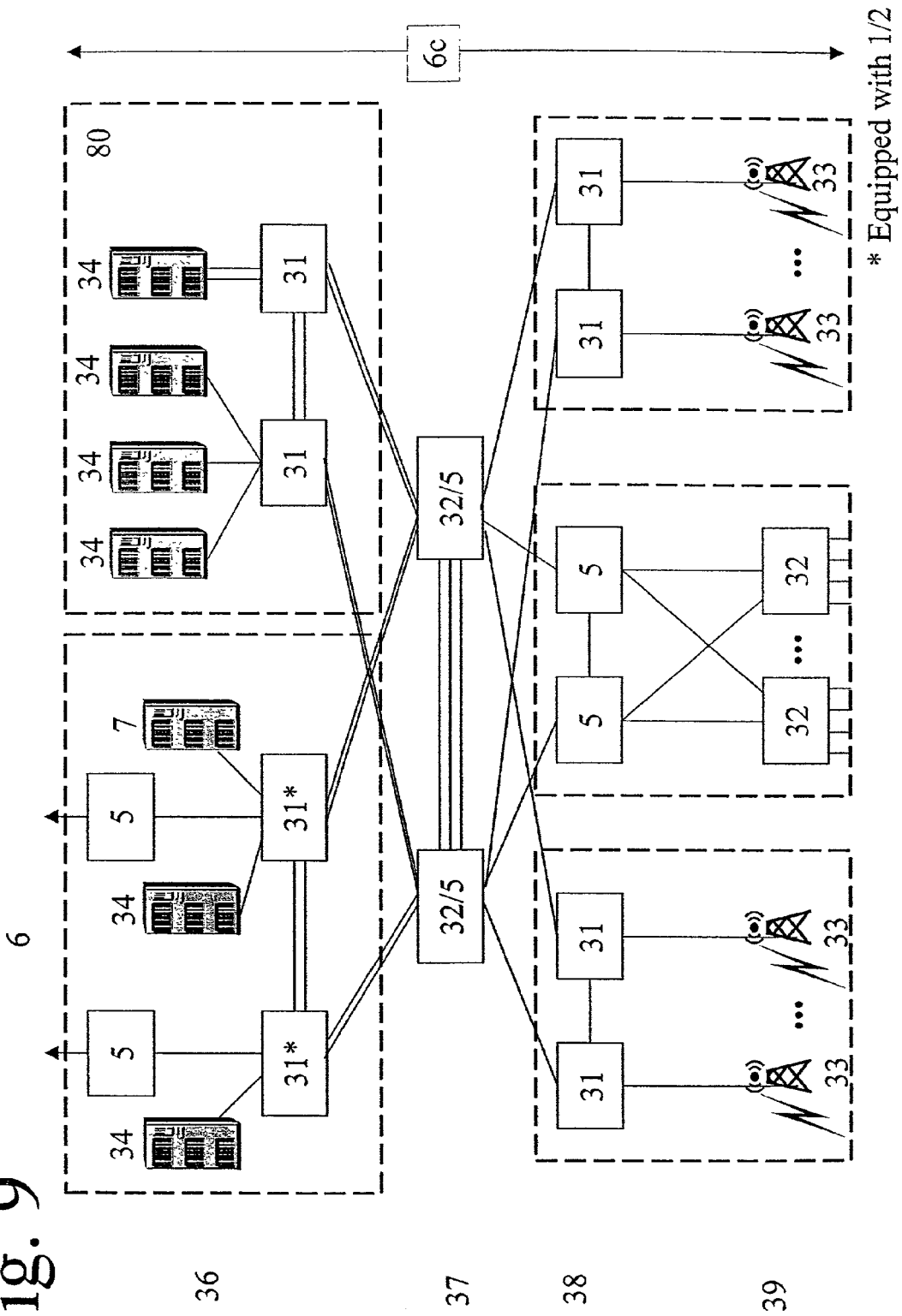
FIG. 9 is a function block diagram illustrating the components in a campus network applying mobility routing internally to track mobile nodes.

FIG. 9 is a function block diagram illustrating a large campus network. In a complete installation, all nodes in the distribution layer 38 of a large campus network will be equipped with mobility routing 31, while only the inner firewall routers 31* of the WAN distribution layer 36 will be equipped with additional mobile IP functionality. Multiple equal cost paths may be available between two mobility routers 31, in which case the mobility routing protocol will perform load balancing between the two paths. Obviously, a company may merely install a firewall router 31* and no other distribution nodes 31 at a smaller branch office. Furthermore, an enterprise may decide to introduce mobility routing 31 gradually into the campus network, e.g. by restricting the deployment to the segments where Wireless LAN access points 33 are deployed at the access layer 39. The mobility routers 31 will be able to function in such a mixed campus environment as well, by running traditional intra-domain routing protocols, like OSPF. The OSPF protocol then has dual purposes. It is partly used to create tunnels between mobility routing nodes 31 for the purpose of carrying mobility routing traffic, and it is partly used to publish aggregate routes for the mobile nodes 3 towards the core layer 37 switches 32/routers 5 and the remaining part of the distribution layer 38 routers 5.

Both the WAN distribution layer 36 and the server farm 80 contain servers 34. The servers 34 hosted by the WAN distribution layer 36 are normally accessible from both the Internet 6 (via router 5*) and from the Intranet 6c. The servers 34 hosted by the server farm 80 are, on the other hand, only accessible from within the Intranet 6c.

The mobile service manager (MSM) 7 for a company will typically be placed at the WAN distribution layer 36 in order to be accessible from the inside as well as from the outside. From a network perspective it will function as a centralized data store from which the mobility routers 31 can fetch user and workgroup profiles. From a management viewpoint, it will be the portal to which the IT-administrator and workgroup members login for managing profiles and exchanging service information.

Figure 10A:
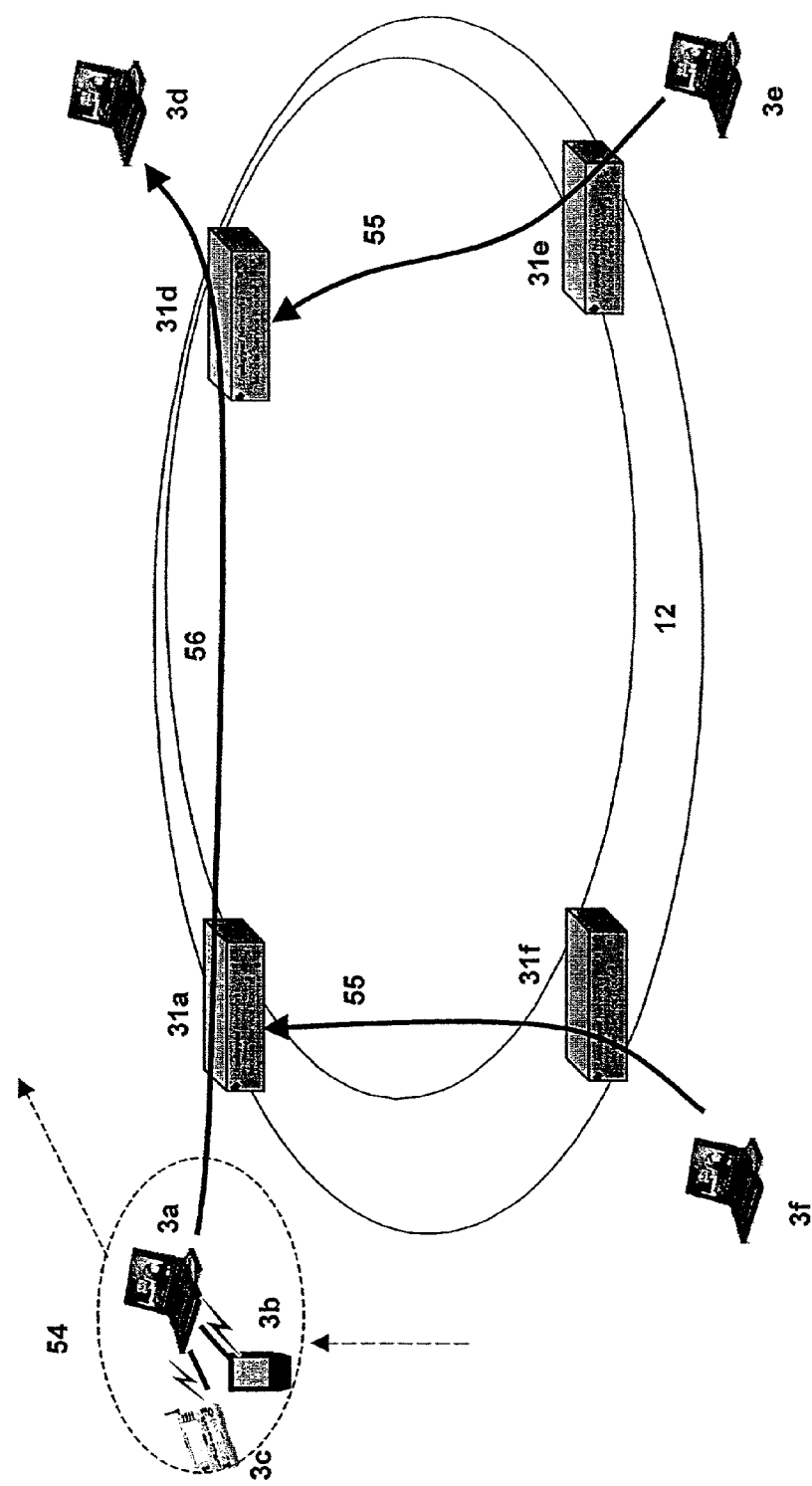
FIG. 10a is a function block diagram illustrating the principle of route propagation in the mobility routing protocol.

FIG. 10a illustrates how route propagation is performed within the campus network (also described as Intranet 6c and home network 12 in this invention). The mobility routing protocol is based on a reactive 55 protocol, like the Ad-hoc On-demand Distance Vector (AODV) protocol as defined in the IETF. In such a protocol, no peers 3d, 3e, or 3f are automatically updated with a new route to mobile node 3a and its (personal area network 54) as it moves from mobility router 31f to mobility route 31a. Similarly, no mobility routers (31a, 31d, 31e and 31f) are updated with the new route unless someone requests them for it. The benefit of this is that the load of route updates becomes low compared to complete proactive routing. Especially in the case when mobile nodes are moving a lot and they are not communicating with too many peers at the same time. This is typically the case in an Intranet 6c, which has applied a mobile virtual private network across multiple sites. A mobile node 3a will then normally communicate with only a few active peers 3b and 3c at the local site as well as some active peers 3d at the headquarters of the company. The mobile node 3a will rarely communicate with other local sites such as the inactive peer 3e.

The following invention extends the basic principle of reactive routing as defined in AODV, in order to preserve the reactive 55 nature of the protocol updates to inactive peers 3f and 3e, while implement a proactive 56 routing update to active peer 3d and its mobility router 31d. This extension ensures a high speed, and equally importantly low packet loss, at handovers. Thus, this mobility routing protocol is using a combination of proactive 56 and reactive 55 route propagation in order to maintain a flat route topology (stable IP addresses for all mobile nodes 3). Proactive advertisements 56 are only propagated to active peers 3d (on-going sessions), while inactive peers 3e and 3f will request a route to the mobile node 3a (and its personal area network 54) only if initiating a session. FIG. 10b illustrates in more details the proactive route advertisements that are added to a reactive routing protocol like Ad-hoc On-demand Distance Vector (AODV) in order to create a fast handover of a mobile node 3a from one mobility router 31f to another mobility router 31a.

The mobile node 3a sends a hello message to its new sink (mobility router 31a) with a destination sequence number 111 set to equal to the last registration reply distributed via the old sink (mobility router 31f). The mobility router 31a takes this first registration reply as a hello message and an indication that it now is asked to take the role of new sink in the core mobility router network for mobile node 3a. If it has already an existing route towards mobile node 3a, with same destination sequence number 111 as received in the hello message, it can start directly to send an unsolicited route reply in the direction towards the old sink (mobility router 31f. If it does not have a route already towards mobile node 3a, it discovers it by sending a route request with the destination sequence number 111 as received from mobile node 3a in the hello message. The earlier sink (mobility router 31f), or any mobility router along the path, will then respond with a route reply message. This is then followed by an unsolicited route reply from the new sink (mobility router 31a) along the same path and having the destination sequence number 111 incremented by one. The old sink (mobility router 31f) and all mobility routers along the path between the old and the new sink are updated with the new route having a better destination sequence number 111+1. The old sink (mobility router 31f) now will forward all datagrams destined to mobile node 3a via the mobility router 31a. A route reply is sent to the mobile node 3a indicating that the handover procedure was successful. The mobile node 3a may now smoothly migrate from the old (mobility router 31f) to the new link (mobility router 31a).

The mobile node 3a may at its leisure also decide to optimize the path towards active peer (mobile node 3d), by initiating route requests towards this destination. The source sequence number (SSN) 112 in these messages are set equal to the new destination sequence number (DSN) 111+1 for mobile node 3a. Bi-directional, optimal paths are now established.

The handover procedure for AODV as defined in FIG. 10b is also suitable for protecting the mobile node 3a against access point 33, access link and mobility router 31 failure. As shown in FIG. 9, the access point 33 normally is only equipped with one interface uplinks towards the distribution layer 38 mobility router 31. In fixed IP networks this constitute a single point of failure at the physical layer and is not recommended. However, in a wireless access layer 39 equipped with a flat mobility routing 31 distribution layer 38, the route update sequence for handover can be applied also at access point 33, access link or old mobility router 31 sink failure. The only difference compared to the handover procedure as described above, is that the new sink (mobility router 31a) will not receive any route reply from a malfunctioning old sink (mobility router 31f). The new sink (mobility router 31a) will, therefore, send a route error rather than a route reply back to the mobile node 3a. The mobile node 3a will take this as an indication that no forwarding path has been created from the old sink (mobility router 31f) to the new sink (mobility router 31a) and immediately start sending route requests towards the active peer (mobile node 3d) in order to repair the path for ongoing sessions.

Furthermore, it shall be noted that the AODV implementation in the mobile node 3a, and as depicted in FIG. 10b, also can be implemented as a proxy in the ingress mobile service router 31a. This eliminates the requirement on AODV implementation on the mobile node 3a. The mobile node 3a will instead utilize a Dynamic Host Configuration Protocol (DHCP) request as its hello message to a new sink 31a. The DHCP request will include the stable IP address of the mobile node 3a and an authenticator for the sink to send further up to the mobile service manager 7 (see FIG. 10c for more explanation on how an authenticator is utilized in the mobile workgroup system). The new sink 31a will then act as a proxy for the mobile node 3a and initiate the handover procedure with old sink 31f in the same way as described in FIG. 10b. For the part on optimizing routes, as shown in the lower part of FIG. 10b, the new sink 31a will initiate such route requests on behalf of the mobile node 3a, based on receiving a datagram from the mobile node 3a with the destination set to mobile node 3d. The reminder of the sequence diagram in FIG. 10b can then be kept unchanged also in the proxy case.

In AODV route requests are being broadcasted, while route replies are being sent using unicast. Broadcast route requests that are sent due to lifetime expiration of an active path are not very effective and cause unnecessary load in the network. For this reason, this invention introduces a gratuitous route reply that can be sent by a route reply source before the route lifetime has expired. Such a gratuitous route reply can be sent using unicast towards the source of the initial route request. For this purpose, a mobility router 31 can be configured with a route reply trigger that specifies the number of seconds that max will remain before a gratuitous route reply will be sent for an active route. The term active route does in this context mean a route for which the mobile service router 31, acting as the source of the original route reply, can detect that datagrams are continuously being forwarded for. By using the gratuitous route reply procedure the mobile workgroup system will allow ongoing streaming sessions with no interruptions due to expiration of route lifetimes.

In the section above, one way to limit broadcasts in the network was described in the form of gratuitous route replies for active sessions. In order to limit the width of broadcast route requests for a new route, AODV recommend the use of expanding ring search based on hop count. This allows a crude way to stepwise search wider for a route reply on a route request for a destination. However, as described in FIG. 9, all the mobility routers 31 at the distribution layer have IP—IP tunnels to each other and therefore all are one hop away. If applying the expanding ring search, this would mean a drastic increase in route requests at the distribution layer border. This invention applies a configurable weight instead of a 1 for each hop in the mobility routing network. With setting the weight differently for different neighbors, the distribution layer network could be segmented, e.g. geographically, so that an expanding ring search would gradually increase more and more neighbor distribution layer routers 31 in FIG. 9.

FIG. 10c shows the second extension to AODV necessary to support mobile workgroups. The extension relates to authentication and FIG. 10c shows the header format of an AODV message applying such an extension. The AODV authentication extension is applied on route requests and replies between neighbors (mobile nodes 3 and mobility routers 31). The extension has a similar format to the scheme as applied to OSPF in RFC 2328.

Version 71: The AODV version number. This specification documents version 2 of the protocol.

| Type 73: The AODV packet types are as follows: | |
|---|---|
| Type | Description |
| 1 | Route Request |
| 2 | Route Reply |
| 3 | Route Error |
| 4 | Route Reply Acknowledgment |

Packet length 74: The length of the AODV protocol packet in bytes. This length includes the standard AODV header.

Router ID 78: The Router ID of the packet's source. It can be a mobility router 31 or a mobile node 3.

Checksum 75: The standard IP checksum of the entire contents of the packet, starting with the AODV packet header but excluding the 64-bit authentication field. This checksum is calculated as the 16-bit one's complement of the one's complement sum of all the 16-bit words in the packet, excepting the authentication field. If the packet's length is not an integral number of 16-bit words, the packet is padded with a byte of zero before checksumming. The checksum is considered to be part of the packet authentication procedure; for some authentication types the checksum calculation is omitted.

AuType 76: Identifies the authentication procedure to be used for the packet.

Authentication 77a and b: A 64-bit field for use by the authentication scheme.

All AODV protocol version 2 exchanges are authenticated. The AODV packet includes an authentication type field 76, and 64-bits of data for use by the appropriate authentication scheme (determined by the type field 76).

The authentication type 76 is configurable on a per-interface (or equivalently, on a per-network/subnet) basis. Additional authentication data 77 is also configurable on a per-interface basis. Authentication types (76) 0, 1 and 2 are defined by this specification. All other authentication types 76 are reserved for definition by the IANA (iana@ISI.EDU). The current list of authentication types 76 is described below:

| AuType | Description |
|--------|-------------|
| 0 | Null authentication |
| 1 | Simple password |
| 2 | Cryptographic authentication |

All others are reserved for assignment by the IANA (iana@ISI.EDU)

Null authentication: Use of this authentication type 76 means that routing exchanges over the network/subnet are not authenticated. The 64-bit authentication field 77 in the AODV header can contain anything; it is not examined on packet reception. When employing Null authentication, the entire contents of each AODV packet (other than the 64-bit authentication field 77) are checksummed in order to detect data corruption.

Simple password authentication: Using this authentication type 76, a 64-bit field is configured on a per-network basis. All packets sent on a particular network must have this configured value in their AODV header 64-bit authentication field 77. This essentially serves as a "clear" 64-bit password. In addition, the entire contents of each AODV packet (other than the 64-bit authentication field) are checksummed in order to detect data corruption.

Simple password authentication guards against routers (mobile node 3 or mobility router 31) inadvertently joining the routing domain; each router must first be configured with its attached networks' passwords before it can participate in routing. However, simple password authentication is vulnerable to passive attacks. Anyone with physical access to the network can learn the password and compromise the security of the AODV routing domain.

Cryptographic authentication: Using this authentication type 76, a shared secret key is configured in all routers attached to a common network/subnet. For each AODV protocol packet, the key is used to generate/verify a "message digest" that is appended to the end of the AODV packet. The message digest is a one-way function of the AODV protocol packet and the secret key. Since the secret key is never sent over the network in the clear, protection is provided against passive attacks.

Figure 10D:
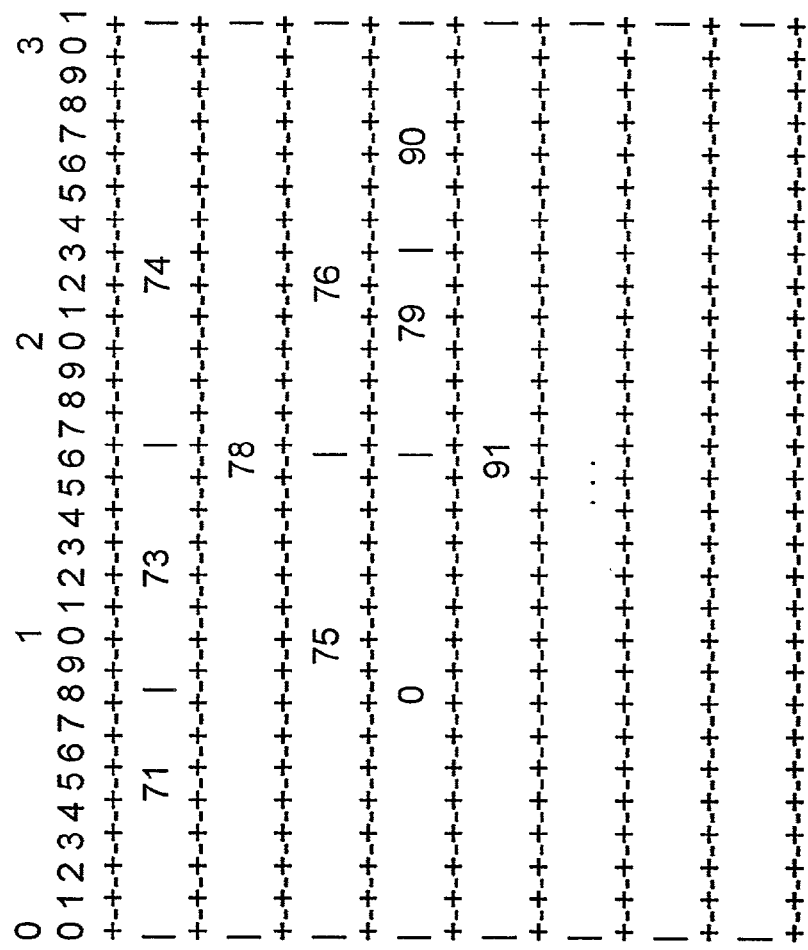
FIG. 10d is a function block diagram illustrating the format of the AODV authentication header extension when applying cryptographic authentication.

The secret key specifies the algorithms used to generate and verify the message digest implicitly. This invention suggests an AODV cryptographic authentication by using the MD5 algorithm. The format of the authentication field 77a and 77b, in the case of cryptographic authentication, is shown in FIG. 10d.

A non-decreasing sequence number is included in each AODV protocol packet to protect against replay attacks. This provides long-term protection; however, it is still possible to replay an AODV packet until the sequence number changes. To implement this feature, each neighbor data structure contains a new field target the "cryptographic sequence number" 91. This field is initialized to zero, and is also set to zero whenever the neighbor's state transitions to "Down". Whenever an AODV packet is accepted as authentic, the cryptographic sequence number 91 is set to the received packet's sequence number.

This invention does not provide a rollover procedure for the cryptographic sequence number 91. When the cryptographic sequence number that the router is sending reach the maximum value, the router should reset the cryptographic sequence number 91 that it is sending back to 0. After this is done, the router's neighbors will reject the router's AODV packets for a period of the configured router dead interval, and then the router will be forced to re-establish all adjacencies over the interface. However, it is expected that many implementations will use "seconds since reboot" (or "seconds since 1960", etc.) as the cryptographic sequence number 91. Such a choice will essentially prevent rollover, since the cryptographic sequence number field 91 is 32 bits in length.

The AODV cryptographic authentication option does not provide confidentiality.

When cryptographic authentication is used, the 64-bit authentication field 77 in the standard AODV packet header is redefined as shown in FIG. 10d. The new field definitions are as follows:

Key ID 79: This field identifies the algorithm and secret key used to create the message digest appended to the OSPF packet. Key Identifiers 79 are unique per-interface (or equivalently, per-subnet).

Auth Data Length 90: The length in bytes of the message digest appended to the AODV packet.

Cryptographic sequence number 91: An unsigned 32-bit non-decreasing sequence number. Used to guard against replay attacks.

Figure 11:
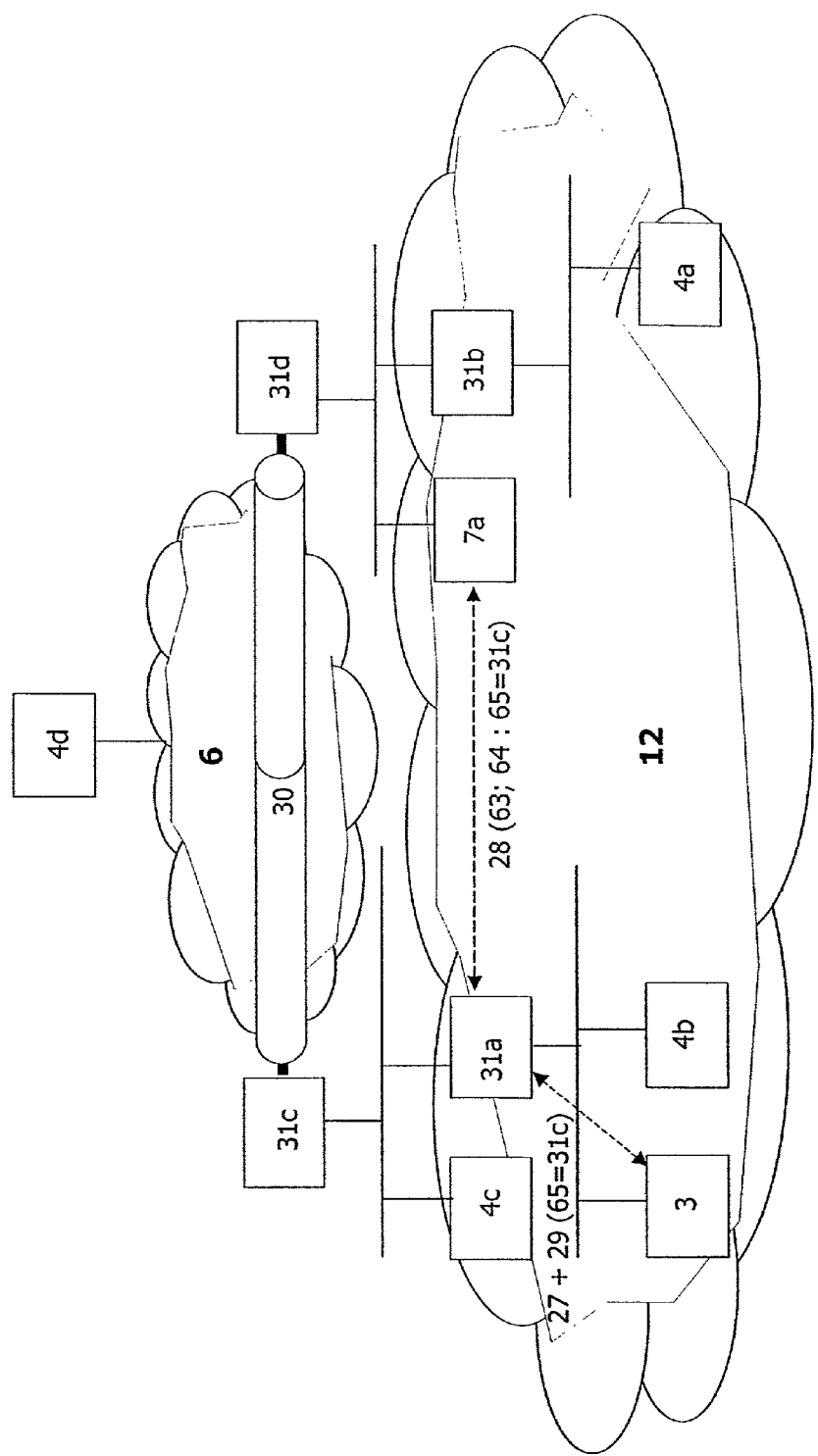
FIG. 11 is a function block diagram illustrating the support of intranet workgroups in a campus network.

FIG. 11 illustrates the deployment of an Intranet workgroup across two or more sites interconnected by an IPSec tunnel 30. The Intranet is applying mobility routing internally in the home network 12 as well as the authentication extension 27 for the mobility routing advertisements 29. As is shown in FIG. 11, there is a mobile service manager 7a deployed at one of the sites in the home network 12. When a mobile node 3a sends a route request for the first time to a mobility router 31a, the mobility router 31a will send a DIAMETER request 28 to the mobile service manager 7a for centralized authentication and configuration download. The DIAMETER response 29 from the mobile service manager 7a will include static routes 63 and filters states 64 that shall be applied for traffic from/to the mobile node 3a. In particular a default route to the home network 12 gateway mobility router 31c as well as the IP address range for the home network 12 is received. These two static routes are sent further in the route reply 29 to the hello message from the mobile node 3a. The mobile node 3a now knows for which address range it shall broadcast AODV reactive 55 route requests instead of applying the default route 31c. Note that the default route can be reached through unicasting route requests.

A variant to the above mentioned shared key authentication procedure, is that the mobile workgroup system applies public keys and certificates for mobile node 3a authentication. The mobile node 3a will then piggyback its X.509 certificate when sending the initial hello message to a new sink 31a. The sink 31a verifies that the certificate is signed by the mobile service manager and uses the public key of the received certificate to authenticate the mobile node 3a. The sink then sends its certificate to the mobile node 3a, whereas the mobile node 3a verifies that the certificate is signed by the mobile service manager 7 and uses the public key of the received certificate to authenticate the mobile service router 31a acting as new sink. The own certificate and the mobile service manager's 7 certificate are retrieved by the mobile node 3a and the mobile services router 31a from the mobile service manager 7 as part of management configuration. As an alternative, the mobile node 3a certificate may also be retrieved by the mobile services router 31a from the mobile service manager 7 as a domain name system query triggered by the initial hello message or as a DIAMETER query triggered by the initial hello message.

Figure 12A:
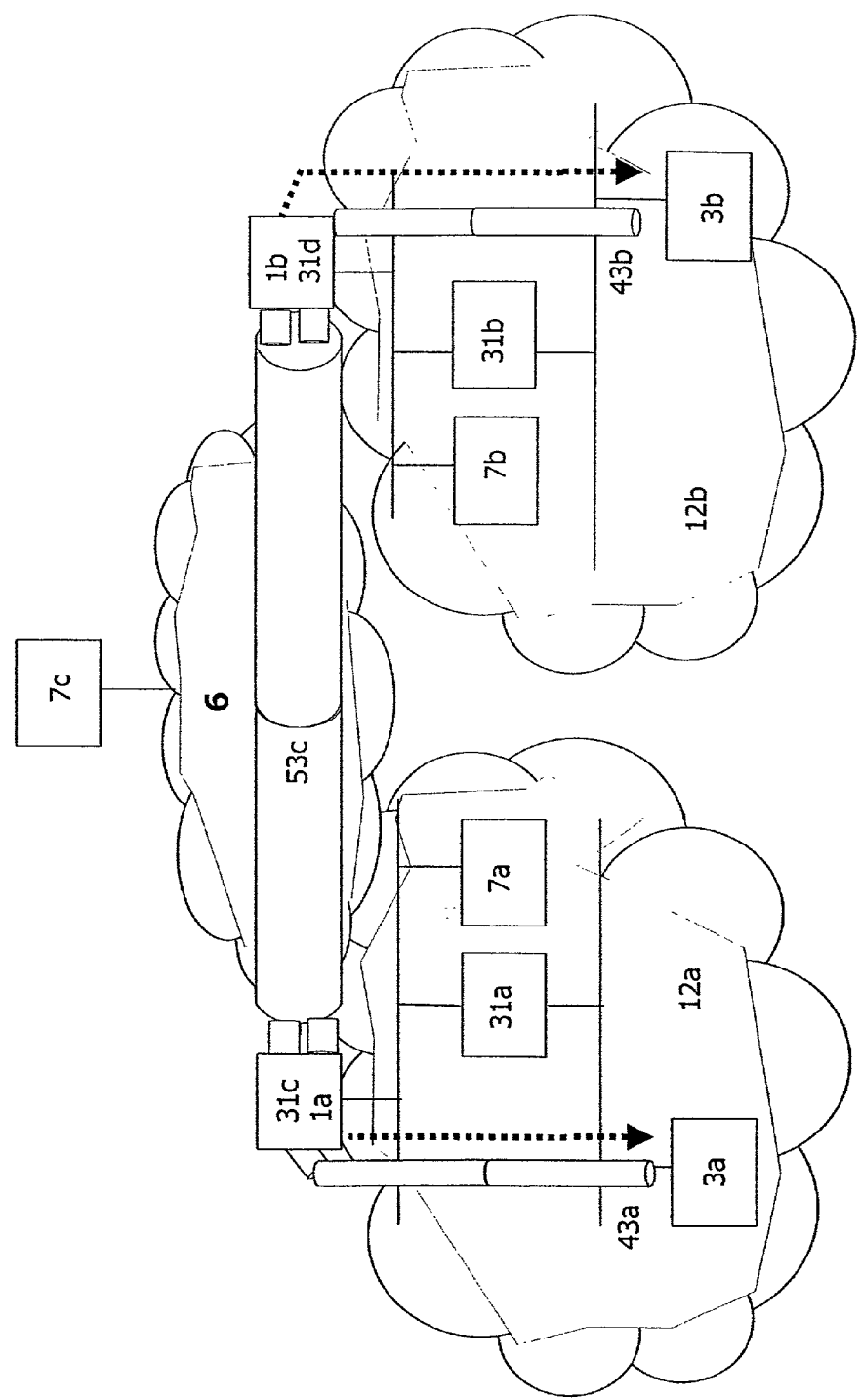
FIG. 12a is a function block diagram illustrating the support of extranet workgroups where the mobile nodes are at their home campus networks.
Figure 12B:
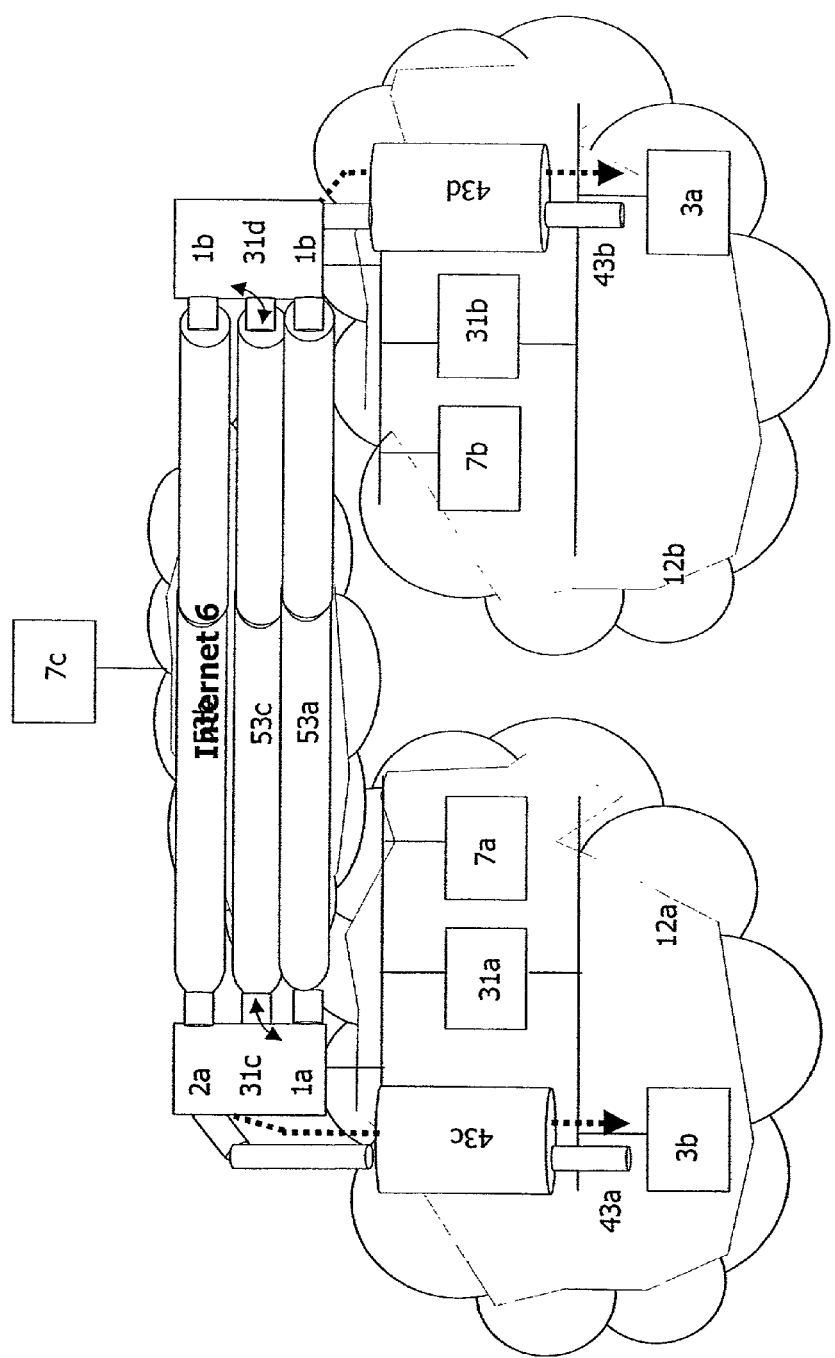
FIG. 12b is a function block diagram illustrating the support of extranet workgroups where the mobile nodes are in visiting campus networks.

FIGS. 12a and 12b illustrate the more complex case of creating an extranet workgroup, i.e. a workgroup across two or more home networks (12a and 12b). FIG. 12a illustrates the case where the mobile nodes 3a and 3b are in their respective home networks 12a and 12b. The gateways router MR 31c has now also been equipped with home agent functionality 1a. The home agents 1a and 1b are acting as security gateways for each mobile virtual private network (in FIG. 12a depicted as mere home networks 12a and 12b). As described in detail in FIGS. 4a/4b and 6a/6b, the initiating party (mobile node 3a) is establishing an IPSec security association 43a with the target party's (mobile node 3b) security gateway (home agent 1b). Similarly, the target party (mobile node 3b) is establishing an IPSec security association 43b with the initiating party's (mobile node 3a) security gateway (home agent 1a). Each security gateway (1a and 1b) can now perform realm-indexed workgroup filtering on incoming packets to the home network (12a and 12b). The extranet workgroup filters that are used by the security gateways (1a and 1b) are fetched from the common mobile service manager 7c.

There may still be local mobile service managers (7a and 7b) that only controls Intranet workgroups. Their behavior is the same as described in FIG. 11.

FIG. 12b illustrates the most complex scenario of an extranet workgroup, in which case the mobile node 3b is visiting inside home network 12a and mobile node 3a is visiting in home network 12b. When the mobile node 3b is trying to authenticate itself with the mobility router 31a, the answer from the mobile service manager 7a will merely be a default route to the foreign agent 2a (co-located with mobility router 31c). Only this default route is advertised to the mobile node 3b. The sink (mobility route 31a) of mobile node 3b will reject all datagrams with another destination than foreign agent 2a. It is also possible to limit the usage of the home network 12a even further by only allowing the IPSec 43c protocol through.

The foreign agent 2a will act with normal mobile IP behavior and establish a mobile IP tunnel 53b to the home agent 1b of mobile node 3b. The home agent 1b will look up the destination IP address of the datagram (mobile node 3a) in the routing table and send it further through the IP—IP tunnel 53c to the home agent 1a. Note that ipUnplugged has submitted another patent request named "A route optimization technique for mobile IP". If this is applied in the present invention, the foreign agent 2a will not need to send datagrams through the mobile IP tunnel 53b to the home agent 1b. Instead, the datagram can be directly routed to the home agent 1a.

The home agent 1a will perform the extranet workgroup filtering based on configuration from the common mobile service manager 7c and then send the packet via the mobile IP tunnel 53a to the foreign agent 1b for further distribution to the mobile node 3a. Datagrams that are sent in the other direction from the mobile node 3a to the mobile node 3b are treated the same way using the IPSec tunnel 43d instead.

What is claimed is:

1. A mobile routing system, comprising:
a mobile node; a plurality of sinks in a computer network, the plurality of sinks including a plurality of mobile routers; and
memory storing computer readable instructions, that, when executed by the processor, cause the routing system to perform a method that includes the steps of:
detecting movement of the mobile node between the plurality of sinks in the computer network; and
maintaining a connection by maintaining a stable IP address for the mobile node and sustaining, without packet loss, one or more active application sessions between the mobile node and one or more active peers upon detecting movement of the mobile node in accordance with a predefined reactive routing protocol, wherein the reactive routing protocol is extended by a proactive routing update for the one or more active peers upon detecting movement of the mobile node from an old sink to a new sink, and
wherein one or more replies to a route request sent from the new sink establishes a bi-directional, optimal path between the mobile node and one or more of the active peers.

2. The routing system of claim 1, wherein the reactive routing protocol includes an Ad-hoc On-Demand Distance Vector (AODV) protocol.

3. The routing system of claim 2, wherein the mobile node transmits an initial message to the new sink with a destination sequence number set equal to a destination sequence number of a last registration reply that was distributed via the old sink.

4. The routing system of claim 3, wherein the new sink treats the message as an indication that the mobile node is requesting the new sink to act as the mobile node's ingress router in the network.

5. The routing system of claim 4, wherein the new sink transmits an unsolicited route reply toward the old sink if the new sink has an existing route toward the mobile node in a routing table of the new sink and if the destination sequence number is the same for the route as the one received from the mobile node in the initial message.

6. The routing system of claim 5, wherein the new sink sends a route request with a destination sequence number set to the same value as the sequence number received from the mobile node in the initial message.

7. The routing system of claim 6, wherein the old sink or a mobility router along a path to the old sink, responds with a route reply message.

8. The routing system of claim 7, wherein the new sink sends an unsolicited route reply message for the mobile node destination with the route request source IP address set to the old sink and the destination sequence number incremented by one.

9. The routing system of claim 8, wherein the old sink and one or more mobility routers along the path to the old sink and one or more mobility routers along a path to the new sink are updated with a new route having a preferred destination sequence number.

10. The routing system of claim 9, wherein the old sink forwards packets destined to the mobile node along a route via the new sink.

11. The routing system of claim 10, wherein a route reply is sent from the old sink via the new sink to the mobile node to indicate that a handover procedure has been successful and wherein the new sink sends a route error to the mobile node if it cannot reach the old sink.

12. The routing system of claim 11, wherein the mobile node migrates a forwarding of datagrams from a link of the old sink to a link of the new sink.

13. The routing system of claim 12, wherein the mobile node determines an optimized path toward active peers by initiating route requests toward the active peers.

14. The routing system of claim 13, wherein a source sequence number in the route request to an active peer is set equal to the new destination sequence number of the mobile node.

15. The routing system of claim 1, wherein a mobile service router sink also acts as a proxy for mobility routing protocol exchanges between the mobile node and the network in that the mobile service router sink initiates a route request on behalf of the mobile node upon receipt of a datagram from the mobile node not compliant with an adhoc routing protocol applied in the computer network.

16. The routing system of claim 15, wherein the mobile node uses a Dynamic Host Configuration Protocol (DHCP) request as an initial message to the new sink.

17. The routing system of claim 16, wherein the DHCP request includes the mobile node's IP address and authenticator.

18. The routing system of claim 17, wherein the mobile router sink maps the DHCP request to at least one of a RADIUS request or a DIAMETER request further sent to a mobile service manager for authentication.

19. The routing system of claim 18, wherein the mobile router sink initiates a route request on behalf of the mobile node upon receipt of a datagram from the mobile node.

20. The routing system of claim 19, wherein the mobile router sink buffers received datagrams until a path is established to a destination of the datagrams.

21. The routing system of claim 1, wherein a source of a route reply is configured to initiate a gratuitous route reply toward the source in order to provide continuous streaming of datagrams for active application sessions.

22. The routing system of claim 21, wherein the source of the route reply sends the gratuitous route reply if a life time of the route is expiring within a configured number of seconds and datagrams are received along a path between the mobile node and the one or more active peers.

23. A mobile routing system, comprising:
a mobile node;
a plurality of sinks in a computer network, the plurality of sinks including a plurality of mobile routers; and
memory storing computer readable instructions, that, when executed by the processor, cause the routing system to perform a method that includes the steps of:
detecting movement of the mobile node between the plurality of sinks in the computer network; and
maintaining a connection by maintaining a stable IP address for the mobile node and sustaining, without packet loss, one or more active application sessions between the mobile node and one or more active peers upon detecting movement of the mobile node in accordance with a predefined reactive routing protocol,
wherein the reactive routing protocol includes an Ad-hoc On-Demand Distance Vector (AODV) protocol,
wherein the routing system is further configured to extend the reactive protocol with a proactive routing update for the one or more active peers upon detecting movement of the mobile node from an old sink to a new sink,
wherein the mobile node transmits an initial message to the new sink with a destination sequence number set equal to a destination sequence number of a last registration reply that was distributed via the old sink,
wherein the new sink treats the message as an indication that the mobile node is requesting the new sink to act as the mobile node's ingress router in the routing system network,
wherein the new sink transmits an unsolicited route reply toward the old sink if it has an existing route toward the mobile node in a routing table of the new sink end if the destination sequence number is the same for the route as the one received from the mobile node in the initial message,
wherein the new sink sends a route request with a destination sequence number set to the same value as the sequence number received from the mobile node in the initial message,
wherein the old sink or a mobility router along a path to the old sink, responds with a route reply message,
wherein the new sink sends an unsolicited route reply message for the mobile node destination with the route request source IP address set to the old sink and the destination sequence number incremented by one,
wherein the old sink and one or more mobility routers along the path to the old sink and one or more mobility routers alone a path to the new sink are updated with a new route having a preferred destination sequence number,
wherein the old sink forwards packets destined to the mobile node along a route via the new sink,
wherein a route reply is sent from the old sink via the new sink to the mobile node to indicate that a handover procedure has been successful and wherein the new sink sends a route error to the mobile node if it cannot reach the old sink,
wherein the mobile node migrates a forwarding of datagrams from a link of the old sink to a link of the new sink,
wherein the mobile node determines an optimized path toward active peers by initiating route requests toward the active peers,
wherein a source sequence number in the route request to an active peer is set equal to the new destination sequence number of the mobile node, and
wherein one or more replies to the route request establishes a bi-directional, optimal path between the mobile node and the one or more active peers.

24. A mobile routing system, comprising:
a mobile node;
a plurality of sinks in a computer network, the plurality of sinks including a plurality of mobile routers; and
memory storing computer readable instructions, that, when executed by the processor, cause the routing system to perform a method that includes the steps of:
detecting movement of the mobile node between the plurality of sinks in the computer network; and
maintaining a connection by maintaining a stable IP address for the mobile node and sustaining, without packet loss, one or more active application sessions between the mobile node and one or more active peers upon detecting movement of the mobile node in accordance with a predefined reactive routing protocol,
wherein weights are assigned to neighbor hops in order to limit broadcast route requests when applying an expanding ring search algorithm in a reactive routing protocol.

25. The routing system of claim 24, wherein a weight for a hop can be administratively configured on a mobile router.

26. The routing system of claim 25, wherein a sum of weights from a source IP address of a request to the mobile router is used to select a path.

27. The routing system of claim 26, wherein mobile routers to which an expanding ring search route request is sent is limited to one or more mobile routers that have the lowest sum of weights from the source IP address of the request to a candidate neighbor mobile router.

28. A mobile routing system, comprising:
a mobile node;
a plurality of sinks in a computer network, the plurality of sinks including a plurality of mobile routers; and
memory storing computer readable instructions, that, when executed by the processor, cause the routing system to perform a method that includes the steps of:
detecting movement of the mobile node between the plurality of sinks in the computer network; and
maintaining a connection by maintaining a stable IP address for the mobile node and sustaining, without packet loss, one or more active application sessions between the mobile node and one or more active peers upon detecting movement of the mobile node in accordance with a predefined reactive routing protocol,
wherein a source of a route reply is configured to initiate a gratuitous route reply toward the source in order to provide continuous streaming of datagrams for active application sessions,
wherein the source of the route reply sends the gratuitous route reply if a life time of the route is expiring within a configured number of seconds and datagrams are received along a path between the mobile node and the one or more active peers, and
wherein the configured number of seconds triggering gratuitous route reply from the route reply source is larger than a configured number of seconds left on the route lifetime triggering a new route request from the route request source.

29. A mobile routing system, comprising:
a mobile node;
a plurality of sinks in a computer network, the plurality of sinks including a plurality of mobile routers; and
memory storing computer readable instructions, that, when executed by the processor, cause the routing system to perform a method that includes the steps of:
detecting movement of the mobile node between the plurality of sinks in the computer network; and
maintaining a connection by maintaining a stable IP address for the mobile node and sustaining, without packet loss, one or more active application sessions between the mobile node and one or more active peers upon detecting movement of the mobile node in accordance with a predefined reactive routing protocol,
wherein a source of a route reply is configured to initiate a gratuitous route reply toward the source in order to provide continuous streaming of datagrams for active application sessions,
wherein the source of the route reply sends the gratuitous route reply if a life time of the route is expiring within a configured number of seconds and datagrams are received along a path between the mobile node and the one or more active peers, and
wherein the gratuitous route reply is unicast along a spanning tree created for active sessions towards a destination.

* * * * *

UNITED STATES PATENT AND TRADEMARK OFFICE
CERTIFICATE OF CORRECTION

| | | |
|---|---|---|
| PATENT NO. | : 7,155,518 B2 | Page 1 of 1 |
| APPLICATION NO. | : 09/755027 | |
| DATED | : December 26, 2006 | |
| INVENTOR(S) | : Jan Forslow | |

It is certified that error appears in the above-identified patent and that said Letters Patent is hereby corrected as shown below:

In Claim 23, Column 24, Line 23:
    Please delete "routers alone a path" and insert --routers along a path--

Signed and Sealed this

Sixth Day of November, 2007

JON W. DUDAS
*Director of the United States Patent and Trademark Office*